United States Patent [19]
Pall et al.

[11] Patent Number: 5,846,438
[45] Date of Patent: Dec. 8, 1998

[54] FIBROUS WEB FOR PROCESSING A FLUID

[75] Inventors: David B. Pall, Roslyn Estates; Richard L. Manteuffel, Centerport, both of N.Y.

[73] Assignee: Pall Corporation, East Hills, N.Y.

[21] Appl. No.: 376,190

[22] Filed: Jan. 20, 1995

Related U.S. Application Data

[63] Continuation-in-part of Ser. No. 281,772, Jul. 28, 1994, Pat. No. 5,582,907.

[51] Int. Cl.[6] ..................................................... B01D 37/00
[52] U.S. Cl. .......................... 210/767; 210/488; 210/491; 210/508; 210/806
[58] Field of Search ..................................... 210/767, 483, 210/488, 491, 496, 508, 806; 428/903

[56] References Cited

U.S. PATENT DOCUMENTS

| | | |
|---|---|---|
| 2,399,258 | 4/1946 | Taylor . |
| 2,574,221 | 11/1951 | Modigliani . |
| 2,656,873 | 10/1953 | Stephens . |
| 2,664,375 | 12/1953 | Slayter . |
| 2,785,442 | 3/1957 | Boggs . |
| 2,939,761 | 6/1960 | Stein . |
| 3,051,602 | 8/1962 | Schairbaum . |
| 3,134,704 | 5/1964 | Modigliani . |
| 3,266,966 | 8/1966 | Patchell . |
| 3,314,840 | 4/1967 | Lloyd et al. . |
| 3,412,865 | 11/1968 | Lontz et al. . |
| 3,438,587 | 4/1969 | Jackson . |
| 3,441,468 | 4/1969 | Siggel et al. . |
| 3,459,613 | 8/1969 | Copenhefer et al. . |
| 3,477,892 | 11/1969 | Plymale . |
| 3,490,975 | 1/1970 | Lightwood et al. . |
| 3,506,420 | 4/1970 | Jackson et al. . |
| 3,526,557 | 9/1970 | Taylor . |
| 3,579,403 | 5/1971 | Stroop . |
| 3,595,245 | 7/1971 | Buntin . |
| 3,615,995 | 10/1971 | Buntin . |
| 3,650,866 | 3/1972 | Prentice . |
| 3,676,239 | 7/1972 | Soehngen . |
| 3,676,242 | 7/1972 | Prentice . |
| 3,704,198 | 11/1972 | Prentice . |
| 3,705,068 | 12/1972 | Dobo et al. . |
| 3,755,527 | 8/1973 | Keller et al. . |
| 3,787,265 | 1/1974 | McGinnis et al. . |
| 3,795,571 | 3/1974 | Prentice . |
| 3,801,400 | 4/1974 | Vogt et al. . |
| 3,825,379 | 7/1974 | Lohkamp et al. . |
| 3,825,380 | 7/1974 | Harding et al. . |
| 3,833,438 | 9/1974 | Kaneko et al. . |
| 3,836,416 | 9/1974 | Ropiequet . |
| 3,849,241 | 11/1974 | Butin et al. . |
| 3,854,917 | 12/1974 | McKinney et al. . |
| 3,933,557 | 1/1976 | Pall . |
| 3,940,302 | 2/1976 | Matthews et al. . |
| 3,978,185 | 8/1976 | Buntin et al. . |
| 4,021,281 | 5/1977 | Pall . |
| 4,032,688 | 6/1977 | Pall . |
| 4,048,364 | 9/1977 | Harding et al. . |
| 4,116,738 | 9/1978 | Pall . |

(List continued on next page.)

FOREIGN PATENT DOCUMENTS

| | | |
|---|---|---|
| 0284232 | 9/1988 | European Pat. Off. . |
| 0597577 | 5/1994 | European Pat. Off. . |
| 9304763 | 3/1993 | WIPO . |
| 9319831 | 10/1993 | WIPO . |

OTHER PUBLICATIONS

Schwartz et al., "New Concepts..Melt–Blown..Microfibers..Co–Spun" Mar. 1987,Int'l.Nonwovens Tech Conf., pp. 206–220 (HiltonHead, SC).

"Breakthrough in Nonwoven Webs Made by Improved Melt–Blowing. . . ", Biax–Fiberfilm Corp. Technical Bullet 10B, Neenah, WI.

"Melt Blown", J and M Laboratories, Inc., Brochure, Dawsonville, GA.

Primary Examiner—James J. Bell
Attorney, Agent, or Firm—Leydig, Voit & Mayer

[57] ABSTRACT

Melt-blown fibrous webs having a uniform structure for use in processing biological fluids are disclosed.

63 Claims, 5 Drawing Sheets

U.S. PATENT DOCUMENTS

| | | |
|---|---|---|
| 4,238,175 | 12/1980 | Fujii et al. . |
| 4,240,864 | 12/1980 | Lin . |
| 4,340,479 | 7/1982 | Pall . |
| 4,380,570 | 4/1983 | Schwarz . |
| 4,415,608 | 11/1983 | Epperson et al. . |
| 4,428,908 | 1/1984 | Ashley et al. . |
| 4,475,972 | 10/1984 | Wong . |
| 4,477,575 | 10/1984 | Vogel et al. . |
| 4,478,620 | 10/1984 | Tamura . |
| 4,491,012 | 1/1985 | Peterson . |
| 4,552,707 | 11/1985 | How . |
| 4,594,202 | 6/1986 | Pall et al. . |
| 4,650,506 | 3/1987 | Barris et al. . |
| 4,726,901 | 2/1988 | Pall et al. . |
| 4,731,215 | 3/1988 | Schwarz . |
| 4,738,740 | 4/1988 | Pinchuk et al. . |
| 4,764,324 | 8/1988 | Burnham . |
| 4,774,001 | 9/1988 | Degen et al. . |
| 4,786,603 | 11/1988 | Wielinger et al. . |
| 4,810,470 | 3/1989 | Burkhardt et al. . |
| 4,826,642 | 5/1989 | Degen et al. . |
| 4,838,972 | 6/1989 | Daamen et al. . |
| 4,839,297 | 6/1989 | Freitag et al. . |
| 4,849,340 | 7/1989 | Oberhardt . |
| 4,857,453 | 8/1989 | Ullman et al. . |
| 4,880,548 | 11/1989 | Pall et al. . |
| 4,883,764 | 11/1989 | Kloepfer . |
| 4,889,630 | 12/1989 | Reinhardt et al. . |
| 4,925,566 | 5/1990 | Bardot et al. . |
| 4,925,572 | 5/1990 | Pall . |
| 4,943,522 | 7/1990 | Eisinger et al. . |
| 4,999,080 | 3/1991 | Boich . |
| 4,999,287 | 3/1991 | Allen et al. . |
| 5,006,464 | 4/1991 | Chu et al. . |
| 5,006,474 | 4/1991 | Horstman et al. . |
| 5,061,170 | 10/1991 | Allen et al. . |
| 5,069,945 | 12/1991 | Wrasidlo . |
| 5,079,080 | 1/1992 | Schwarz . |
| 5,079,174 | 1/1992 | Buck et al. . |
| 5,089,122 | 2/1992 | Chmiel . |
| 5,102,484 | 4/1992 | Allen et al. . |
| 5,114,673 | 5/1992 | Berger et al. . |
| 5,122,211 | 6/1992 | Roach . |
| 5,145,689 | 9/1992 | Allen et al. . |
| 5,160,486 | 11/1992 | Schlipferbacher et al. . |
| 5,160,746 | 11/1992 | Dodge, II et al. . |
| 5,240,862 | 8/1993 | Koenhen et al. . |
| 5,260,222 | 11/1993 | Patel et al. . |
| 5,266,219 | 11/1993 | Pall et al. . |
| 5,271,895 | 12/1993 | McCroskey et al. . |
| 5,298,165 | 3/1994 | Oka et al. . |
| 5,302,346 | 4/1994 | Vogel et al. . |
| 5,330,715 | 7/1994 | Blake et al. . |
| 5,393,493 | 2/1995 | Makino et al. . |

FIBROUS WEB FOR PROCESSING A FLUID

This application is a continuation-in-part application of application Ser. No. 08/281,772, filed Jul. 28, 1994, which is U.S. Pat. No. 5,582,907 incorporated by reference in its entirety.

TECHNICAL FIELD

This invention relates to fibrous webs for use in processing fluids, e.g., biological fluids such as blood, urine, and saliva. The devices and methods of the present invention are particularly useful for separating plasma or serum from blood.

BACKGROUND OF THE INVENTION

Many body fluid processing protocols, particularly those involving diagnostic testing, include determining whether a particular substance, e.g., a target analyte, is present in the body fluid. Many of these tests rely on colorimetric or spectrophotometric evaluation of a reaction of a fluid component with one or more specific reagents. Other tests include evaluating changes in pH or electrical conductance to determine the presence of the analyte. However, these tests may yield less than optimum results, since, for example, the fluid may fail to efficiently wet the test device, and/or other substances present in the body fluid may interfere with the particular substance to be analyzed and/or cause difficulties in interpreting the test results.

Illustratively, when the body fluid to be tested is blood, the red color due to the presence of red blood cells and/or the hemoglobin released by hemolyzed red cells may interfere with diagnostic tests which employ color change as part of their procedure. Accordingly, many body fluid testing protocols include separating one or more components from the body fluid before testing. For example, plasma or serum may be separated from blood before subjecting the plasma or serum to analysis, so that cellular material, e.g., red and/or white blood cells, will not interfere with the test results.

One technique for separating plasma or serum from other blood components such as red blood cells includes obtaining blood, e.g., from a finger prick, and placing the blood on a blood test strip. The test strip, which includes at least one porous element, allows blood to flow into the strip, and a portion of plasma to be separated from the cells contained in the blood sample. Some test strips may include a plurality of porous elements that allow the passage of plasma or serum therethrough, wherein at least one element may include one or more reagents that react with the analyte so that the presence of the analyte in the plasma or serum may be determined.

However, the prior art test strips suffer from a number of drawbacks. A particular drawback is a lack of product reproducibility, as the strips are difficult to produce with a sufficient degree of uniformity. For example, some strips are insufficiently uniform to provide for efficient and/or reproducible plasma separation. Illustratively, some strips include fibrous webs having a stripy appearance resulting from a lack of uniform fiber distribution, e.g., ridges of fibers. Since the fiber distribution is not uniform, some test strips include multiple layers of webs, e.g., about 10 layers or more, to provide for separation. In view of the number of layers, such devices may require a relatively large amount of blood to provide sufficient plasma for a diagnostic test.

Other devices, with or without fibrous media, fail to provide a sufficiently large plasma front ahead of the front of cellular material to allow testing of the plasma without interference from the cellular material, consequently, the failure of these devices to efficiently separate plasma may require the use of a relatively large blood sample to assure that sufficient plasma is available to be tested.

Additionally, since some devices include one or more reagents preplaced in one or more areas of the device, a lack of product reproducibility from one device to another may lead to the failure of the plasma to contact the reagent(s) in a particular location and/or to contact the reagent(s) for a sufficient amount of time. For example, since some preplaced reagents are soluble, devices that allow the plasma to pass through too quickly may fail to allow the plasma to dissolve the reagent, leading to an inaccurate test result. Accordingly, due to a lack of uniformity, two devices may provide different test results for the same patient using consecutive drops of blood, and it may be difficult to determine which, if either, of the devices have provided an accurate result.

Furthermore, particularly for some of those strips including at least two porous elements secured to each other, it may be awkward and/or difficult to bond the elements together. Not only is the bond generally weak, but the elements tend to be undesirably compressed when they are pressed together to form the bond, which in turn decreases the effectiveness of plasma separation. Moreover, the permeability of the bond, or the area near the bond, may be adversely affected.

Accordingly, there is an ongoing need in the art for body fluid processing devices and methods for using them that provide for efficient separation of at least one desired component of the body fluid in sufficient amounts for analysis. Such processing devices are preferred to be easy to use, whether it is by patients, or by medical personnel such as physicians, nurses, or lab technicians. Moreover, the devices should be sufficiently uniform so that the test results are accurate and reproducible.

Additionally, the devices are preferred to allow efficient separation of plasma from blood without removing a significant proportion of the substance(s) or material(s) in the plasma to be analyzed or determined, e.g., glucose, cholesterol, lipids, serum enzymes, nucleic acids, viruses, bacteria, and/or coagulation factors, to name but a few.

The present invention provides for ameliorating at least some of the disadvantages of the prior art test strips and methods for using them. The present invention can also be used for protocols involving the processing of non-biological fluids. These and other advantages of the present invention will be apparent from the description as set forth below.

SUMMARY OF THE INVENTION

In accordance with the present invention, a device for processing a fluid comprises at least one melt-blown substantially uniform fibrous web. This melt-blown fibrous web is substantially uniform with respect to at least one of, and more preferably, at least two of, fiber diameter, weight distribution when measured in both the longitudinal and transverse directions, thickness, and voids volume. Since the melt-blown webs according to the invention are substantially uniform, test devices including these webs provide accurate and reproducible test results from one device to another, and from one sample of fluid, particularly biological fluid, to another.

Devices and methods according to the present invention provide for efficient processing of fluid. For example, devices and methods according to the present invention provide for efficient plasma separation from biological fluids such as blood by contacting at least one melt-blown substantially uniform fibrous web with a sample of the biological fluid. The present invention allows analytes of interest in the separated plasma or serum to be determined accurately and reproducibly. Devices and methods according to the invention also provide for efficiently processing plasma that has already been separated from the biological fluid.

Preferably, the melt-blown substantially uniform fibrous webs according to the invention are compatible with a variety of other porous media such as membranes for processing biological fluid, and allow plasma to be passed, e.g., wicked, from the melt-blown webs to these other media. In some embodiments, plasma may be further passed from the downstream membrane to at least one additional porous medium, such as, for example, another membrane, and/or a melt-blown fibrous web, which is preferably a melt-blown substantially uniform fibrous web.

In accordance with devices and methods according to the invention, substances or analytes of interest, such as lipids, enzymes, nucleic acids and/or viruses, that are in the plasma, or may be transported with the serum, can be captured or isolated in or on the melt-blown substantially uniform fibrous web and/or the other porous media downstream of the web. These substances or analytes can be detected or quantified in the web and/or the other media. In some embodiments, at least a portion or a component in the sample of the isolated analyte can be amplified and detected, and the presence of this portion or component indicates the presence of the analyte in the fluid being tested. For example, in accordance with the invention, an analyte such as a virus can be captured or isolated in or on a membrane downstream of the melt-blown substantially uniform fibrous web, and the virus can be lysed to release the viral nucleic acid, i.e., DNA or RNA. Subsequently, a portion of the viral nucleic acid can be amplified and detected by means well known in the art. The detection of the portion of the viral DNA or RNA indicates the presence of the analyte virus.

In describing the present invention, the following terms are used as described below.

(A) Biological Fluid. Biological fluid includes any treated or untreated fluid associated with living organisms, including, but not limited to blood, saliva, lymph, cerebrospinal fluid, and urine. Biological fluid particularly includes blood, including whole blood, warm or cold blood, and stored or fresh blood; treated blood, such as blood diluted with a physiological solution, including but not limited to saline, nutrient, and/or anticoagulant solutions; one or more blood components, such as platelets suspended in plasma, platelet concentrate (PC), platelet-rich plasma (PRP), platelet-free plasma, platelet-poor plasma (PPP), plasma, packed red cells (PRC), buffy coat; analogous blood products derived from blood or a blood component or derived from bone marrow; red cells suspended in physiological fluid; and platelets suspended in physiological fluid. The biological fluid may include leukocytes, or may have been treated to remove leukocytes. As used herein, biological fluid refers to the components described above, and to similar blood products obtained by other means and with similar properties.

(B) Analyte. Analyte includes but is not limited to at least one of the following: glucose; cholesterol; urea; triglycerides; ketones; bilirubin; urobilinogen; nitrites; theophylline; galactose; lipids; serum enzymes; proteins; hormones; nucleic acids; coagulation factors; ions such as potassium, sodium, calcium, and lithium; drugs such as morphine, codeine, heroin, cocaine, steroids, and marijuana; metabolites; pesticides; pollutants; blood components such as plasma, platelets, red blood cells, and leukocytes; viruses; and microorganisms such as bacteria and protozoa. An analyte can be an antigen or an antibody.

An analyte can be determined directly or be treated so that a portion or component of the analyte can be detected. Illustratively, an analyte such as a virus may be treated to release the viral nucleic acid, and a portion of the nucleic acid can be detected.

BRIEF DESCRIPTION OF THE DRAWINGS

FIG. 10A is an end view of a melt-blowing apparatus with two rows of angled and offset fiberizing nozzles, while

DETAILED DESCRIPTION OF THE PREFERRED EMBODIMENTS

Figure 1:
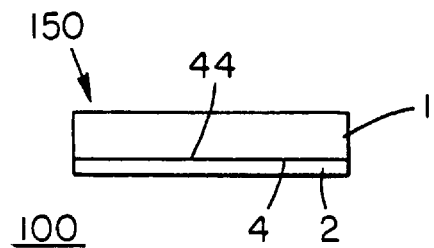
FIG. 1 is a side view of a preferred embodiment of the present inventive test strip utilizing a single web and a nonporous structure.

The present invention comprises a device for processing a fluid, preferably a biological fluid. Embodiments of the device can be used for determining the presence of at least one analyte in the biological fluid and/or separating a portion of plasma from a plasma-containing biological fluid. The device includes at least one substantially uniform melt-blown fibrous web, said device having a region for receiving a biological fluid sample containing an analyte and other substances, and a region into which said analyte flows, without at least a portion of said other substances. The device can be configured to provide predominantly vertical, or predominantly horizontal flow.

The fibrous web preferably includes a region into which at least one analyte flows without at least a portion of the other substances. The web can include at least one surface suitable for contacting the biological fluid sample, and, can include at least one surface through which said analyte flows, preferably without at least a portion of said other substances. Fluid can flow through opposing surfaces, or non-opposing surfaces, of a fibrous web. The fibrous web, which comprises a non-woven web, can be characterized in several ways. Preferably, the non-woven web comprises fibers such that 90% of the fibers have a diameter ranging from a minimum fiber diameter to a maximum fiber diameter which is no more than about three times the minimum fiber diameter. Moreover, the fibrous web preferably should have a critical wetting surface tension (CWST) of at least about 65 dynes/cm.

The present inventive device can also include two or more substantially uniform melt-blown fibrous webs, wherein one of the webs includes a region for receiving a biological fluid sample containing an analyte and other substances, and another web includes the region into which said analyte flows, without at least a portion of said other substances.

The present inventive device can also comprise a porous medium having an upstream surface and a downstream surface, wherein at least a portion of the upstream surface of the porous medium is in fluid communication with a surface of the fibrous web, and wherein the porous medium allows for the analyte to be captured thereby and prevents at least some of the other substances from passing therein. The porous medium can be coextensive with the fibrous web or can have a cantilevered region which extends beyond the web. The porous medium can be of any suitable material in any suitable configuration, e.g., a microporous membrane, including but not limited to a nylon membrane, a polyvinylidene fluoride (PVDF) membrane, and a polysulfone membrane.

The microporous membrane can be a virus removing membrane, such as, for example, an isotropic, skinless, polyvinylidene fluoride membrane, particularly such a porous membrane which has a titer reduction of at least about $10^8$ against $T_1$ bacteriophage and/or a $K_{UF}$ of at least about 15 psi when tested using liquid pairs having an interfacial tension of about 4 dynes/cm. The virus removing membrane can be an ultrafiltration/diafiltration membrane that is capable of excluding 0.02 $\mu$m diameter, monodisperse, latex particles and is capable of being dried without loss of such ultrafiltration properties and which after being wet/dry cycled at least once will have a $K_{UF}$ flow rate at 10 psi, using 1-butanol saturated with water as the wetting liquid and water saturated with 1-butanol as the displacing liquid at ambient temperature, below 50 cc/min per square foot of membrane. Suitable ultrafiltration/diafiltration membranes include polysulfone membranes, such as polyethersulfone or polyphenyl sulfone membranes.

The present inventive device can further comprise a nonporous structure which is in contact with a surface of at least one fibrous web and/or at least one other porous medium.

The present inventive device can additionally comprise at least a second porous medium interposed between the fibrous web and the first porous medium. In such an embodiment, the second porous medium is preferably a second melt-blown fibrous non-woven web. Alternatively, the present inventive device can additionally comprise a second porous medium having an upstream surface and a downstream surface, with the upstream surface of the second porous medium being in fluid communication with the downstream surface of the first porous medium. In such an alternative embodiment, the first porous medium preferably comprises a porous membrane, e.g., a nylon membrane, a polysulfone membrane, or an isotropic, skinless, polyvinylidene fluoride (PVDF) membrane.

One such suitable membrane comprises a porous PVDF membrane which has a titer reduction of at least about $10^8$ against $T_1$ bacteriophage and/or a $K_{UF}$ of at least about 15 psi when tested using liquid pairs having an interfacial tension of about 4 dynes/cm, and the second porous medium preferably comprises a melt-blown fibrous non-woven web. Another example of a suitable membrane comprises an ultrafiltration/diafiltration membrane that is capable of excluding 0.02 $\mu$m diameter, monodisperse, latex particles and is capable of being dried without loss of such ultrafiltration properties and which after being wet/dry cycled at least once will have a $K_{UF}$ flow rate at 10 psi, using 1-butanol saturated with water as the wetting liquid and water saturated with 1-butanol as the displacing liquid at ambient temperature, below 50 cc/min per square foot of membrane. Suitable ultrafiltration/diafiltration membranes include polysulfone membranes, such as polyethersulfone or polyphenyl sulfone membranes.

In these embodiments, the present inventive device desirably further comprises one or more nonporous structures adhered to the device so as to reduce evaporation of the biological sample.

In the present inventive device, the fibrous web can be completely uniform as regards voids volume or can contain a compressed portion for a desired effect. For example, the web can contain a compressed portion adjacent to a cantilevered region of the porous medium which prevents at least some of the other substances from passing therethrough to the cantilevered region. The present inventive device can additionally comprise a nonporous structure which is in contact with at least one surface of the fibrous web.

The present invention also provides for a method of processing a fluid, preferably a biological fluid. One embodiment of the present inventive method comprises contacting the biological fluid receiving region of the aforesaid device with a biological fluid sample containing an analyte and other substances. For example, the biological fluid can be blood or a blood product, and the analyte can be at least one of glucose, cholesterol, and a virus. In particular, the biological fluid can be a plasma-containing fluid, wherein the analyte can be a virus, and the biological fluid can include substances such as red and/or white blood cells. In one preferred embodiment of a method in accordance with the invention, plasma is separated from blood.

SPECIFIC EMBODIMENTS

Although the present inventive device can be used with a variety of fluids, preferably biological fluids containing various analytes and other substances, the present inventive device is particularly well-suited for use with blood and blood products, such as separating plasma from blood or other plasma-containing biological fluid, or separating a virus from plasma or other suitable biological fluid. The present inventive device may also be configured to separate large viruses (including viruses of about 0.08 μm in effective diameter or larger) from small viruses (including viruses of about 0.025–0.028 μm in effective diameter), or to separate mixtures of components chromatographically. The following specific embodiments of the present inventive device are described with respect to such illustrative uses.

In one embodiment, this device has a first region for receiving a sample of a biological fluid that includes plasma, e.g., blood, and a second region into which said plasma flows separated from the blood. The device can include a first region for receiving a sample of a biological fluid that includes plasma, and a second region for accumulating the plasma. The placement onto the first region of a biological fluid comprising plasma and at least one cellular component such as red and/or white blood cells can result in plasma accumulating in the second region which is essentially red cell free and may be cell-free.

The device may further comprise at least one additional porous medium in fluid communication with the melt-blown substantially uniform fibrous web so that plasma may flow from the uniform fibrous web into the porous medium or media. For example, plasma from the uniform fibrous web may be wicked from the fibrous web into a downstream medium or media. The plasma in either the web or medium may be analyzed as appropriate. Thus, at least one analyte of interest may be detected in the web. Alternatively, or additionally, at least one analyte of interest may be detected in or on the downstream medium or media. In some embodiments, a device according to the invention may comprise a porous composite structure, including at least one melt-blown substantially uniform fibrous web and at least one porous medium downstream of the web.

In a preferred embodiment, a device according to the invention comprises at least one melt-blown substantially uniform fibrous web and at least one additional porous medium downstream of the web, wherein the additional porous medium comprises a microporous membrane that allows the plasma to flow from the uniform fibrous web into the membrane. As noted above, at least one analyte of interest may be detected in or on this downstream membrane. In some embodiments, a binding agent, e.g., a fibrous thermoplastic resin, may be interposed between the web and the microporous membrane.

In another preferred embodiment, a device according to the invention comprises at least two melt-blown substantially uniform fibrous webs configured to provide fluid communication between the webs. In one embodiment of the device, one of said melt-blown substantially uniform fibrous webs includes a region for receiving a biological fluid containing an analyte and other substances, and another melt-blown substantially uniform fibrous web includes a region into which said analyte flows without at least a portion of said other substances. In accordance with this embodiment, biological fluid can be placed on a first surface of a first melt-blown substantially uniform fibrous web, and the analyte, either separated from the other substances, or not separated from the other substances, can pass through a second surface of the web. This second surface of the web can be, but need not be, opposite the biological fluid receiving first surface. The analyte can pass through a first surface of the additional web into the analyte receiving portion of the additional web. In some embodiments, passing the biological fluid into and/or through the additional web provides for separating the analyte from the other substances in the biological fluid. The flow through at least one of the webs may be predominantly vertical, or predominantly horizontal. Similarly, the flow from one web to another may be predominantly vertically through the device, or predominantly horizontally through the device.

In one preferred embodiment, a device, comprising a melt-blown substantially uniform fibrous web and an additional porous medium comprising a microporous membrane in fluid communication with the web, further comprises at least one more porous medium, preferably an additional melt-blown fibrous web, even more preferably a second melt-blown substantially uniform fibrous web, wherein the microporous membrane is interposed between the additional web and the first web.

In accordance with this embodiment, plasma is allowed to flow from the first uniform web, through a microporous membrane, and into the second web. Preferably, the device is configured with the membrane arranged across the plasma flow path so that at least one analyte may be captured or isolated in or on the membrane. Illustratively, the plasma flows substantially laterally through the first fibrous web, through the analyte-capturing surface of the membrane, through the membrane surface opposite the analyte-capturing surface, and substantially laterally through the second fibrous web. Preferably, the microporous membrane of the device, interposed between the fibrous webs, may capture or isolate at least one analyte such as a virus or a bacterium, which may be analyzed. Even more preferably, the microporous membrane is removable, permitting analytical procedures to detect analytes which may have been captured in or on the membrane. Analyzing the analyte may include lysing the analyte, and, for example, amplifying the analyte's nucleic acid, preferably by a polymerase chain reaction. Analyzing may include examination by electron microscopy.

In an even more preferred embodiment, the device is arranged for ease of separation, if necessary, of the membrane from the first and second webs at an appropriate time, e.g., after capturing an analyte such as a virus in or on the membrane, but before lysing the analyte, if necessary, and amplifying, as appropriate, a portion of the analyte's nucleic acid.

In some embodiments, the device includes at least one nonporous or substantially impermeable structure to provide, for example, support, reduced biological fluid evaporation, and/or maintained contact between the fibrous web and at least one additional porous medium.

Figure 5:
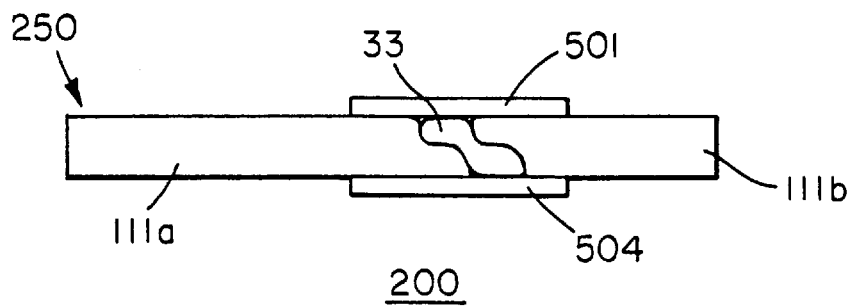
FIG. 5 is a side view of a preferred embodiment of the present inventive test strip utilizing an interposed membrane.
Figure 6:
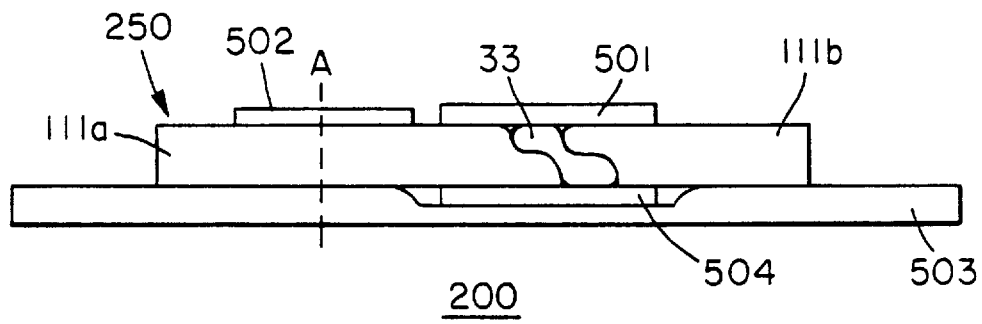
FIG. 6 is a side view of a more preferred embodiment of the present inventive test strip utilizing an interposed membrane.
Figure 7:
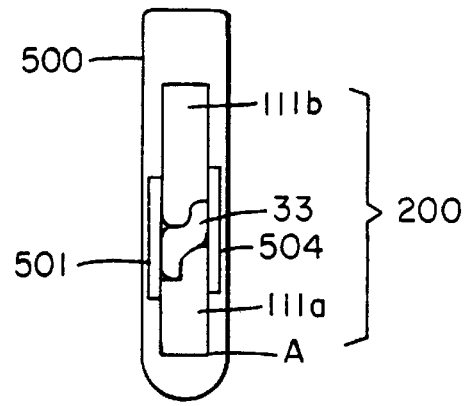
FIG. 7 is an embodiment of the present invention illustrating a test device placed in a container.

FIGS. 1–8, and 14–16 illustrate embodiments of biological fluid processing devices according to the invention that include at least one melt-blown substantially uniform fibrous non-woven web. FIG. 7 illustrates an embodiment wherein a biological fluid processing device is placed in a container. Common elements of the devices have the same reference numbers.

For example, in the embodiments illustrated in FIGS. 1–4, and 14–16, a device 100 includes at least one melt-blown substantially uniform fibrous web 1, wherein the web preferably includes a biological fluid application area or zone 150 on at least a first surface of the web 1.

Figure 3:
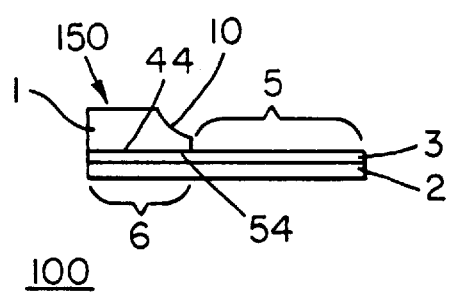
FIG. 3 is a side view of a preferred embodiment of the present inventive test strip utilizing a single web, an additional porous medium, and a substantially impermeable structure.
Figure 14:
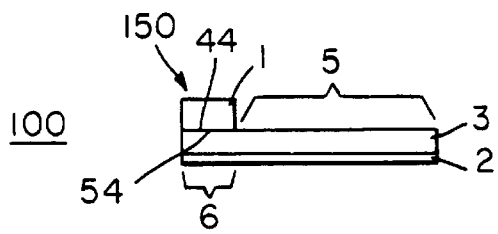
FIG. 14 is a side view of another preferred embodiment of the present inventive test strip utilizing a single web, an additional porous medium, and a substantially impermeable structure.

The illustrated device of FIGS. 3 and 14 also include at least one additional medium 3, which preferably comprises a porous medium such as a microporous membrane. The device may include a plurality of microporous membranes. The web 1 and the other medium 3, e.g., the membrane, may be bound together. For example, in the embodiments illustrated in FIGS. 3 and 14, a binding agent such as a fibrous resin may form a bond between the second surface 44 of the web 1 and the upstream surface 54 of the medium 3. There can also be a bond between fibrous webs, e.g., a binding agent such as a fibrous resin may form a bond between melt-blown substantially uniform fibrous webs 1 and 11 in the embodiment illustrated in FIG. 4. Additionally, or alternatively, in other embodiments, a bond can be formed using, for example, a pressure sensitive adhesive.

In some embodiments of the device, including those having a binding agent between the web 1 and the additional medium 3 (FIGS. 3 and 14), or between the web 11 and the medium 3 (FIG. 4), the web and medium may be separated at a suitable time, e.g., before determining the presence of the analyte(s).

In some embodiments wherein the web and membrane are bound, e.g., as illustrated in FIGS. 3 and 14, a first portion 6 of medium 3 is bound to the web 1, and a second portion 5 of the medium 3 extends beyond web 1, and is not bound thereto.

As illustrated in FIG. 3, the melt-blown substantially uniform fibrous web 1 may include at least one compressed portion 10. In this illustrated embodiment, additional medium 3 comprises a porous medium, preferably a porous membrane, and device 100 further includes at least one additional structure or member 2, preferably a substantially impermeable structure. More preferably, structure 2 comprises a nonporous plastic film or sheet.

Figure 2:
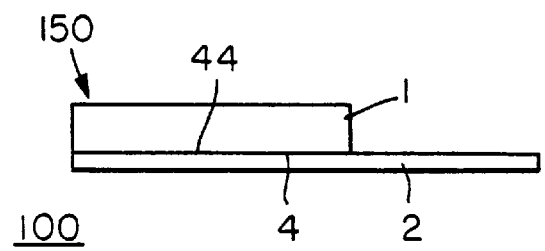
FIG. 2 is a side view of a more preferred embodiment of the present inventive test strip utilizing a single web and a substantially impermeable structure.
Figure 4:
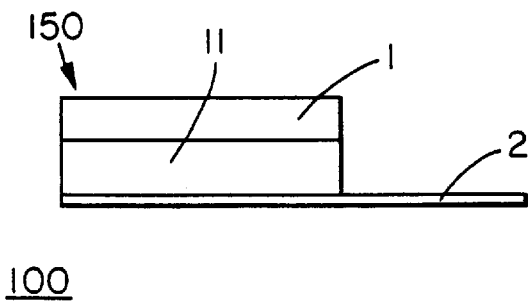
FIG. 4 is a side view of a preferred embodiment of the present inventive test strip utilizing two webs and a substantially impermeable structure.
Figure 15:
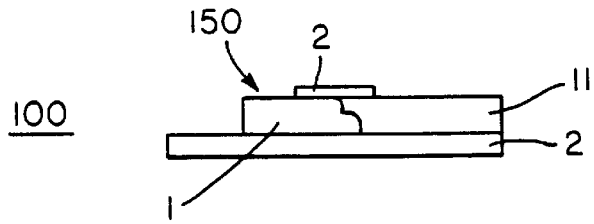
FIG. 15 is a side view of another embodiment of the present inventive test strip utilizing two webs, and two substantially impermeable structures.
Figure 16:
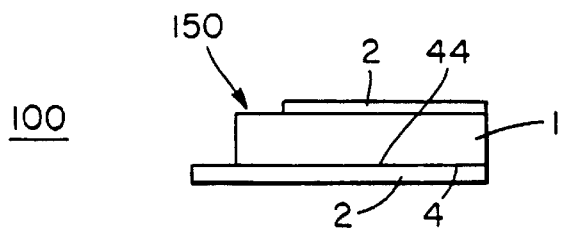
FIG. 16 is a side view of another embodiment of the present inventive test strip utilizing a single web, and two substantially impermeable structures.

Similarly, as illustrated in FIGS. 1, 2, 4, and 14–16, device 100 also includes at least one additional member 2, which preferably comprises a substantially impermeable structure, e.g., a nonporous plastic film or sheet. Structure 2 may be bound to at least one fibrous web and/or at least one porous medium 3. For example, as illustrated in FIGS. 1, 2, and 16, first surface 4 of structure 2 may be bound to second surface 44 of fibrous web 1. Similarly, as illustrated in FIGS. 3, 4, 14, and 15, structure 2 may be bound to porous medium 3 (FIGS. 3 and 14), and/or fibrous webs 1 and/or 11 (FIGS. 4 and 15). Two or more structures 2 may be bound to a device, as shown in FIG. 15 and 16, for example. A variety of bonds are suitable. For example, a fibrous resin may be used to form the bond, and/or structure 2 may include an adhesive, such as a pressure sensitive adhesive.

The device may include a plurality of melt-blown fibrous webs, with or without additional medium 3 and/or structure 2. As noted above, and as illustrated in FIGS. 4 and 15, the device 100 may include at least one additional melt-blown substantially uniform fibrous web 11. The webs 1 and 11 may be bound to each other, e.g., via a binding agent such as a fibrous resin that forms a bond, for example in an embodiment according to FIG. 4. Additionally, or alternatively, at least one additional structure 2 may be utilized to maintain the contact between the webs, as illustrated in FIG. 15. Typically, with respect to the embodiment illustrated in FIG. 15, while webs 1 and 11 are in physical contact with each other, there is no bond between them.

Figure 8:
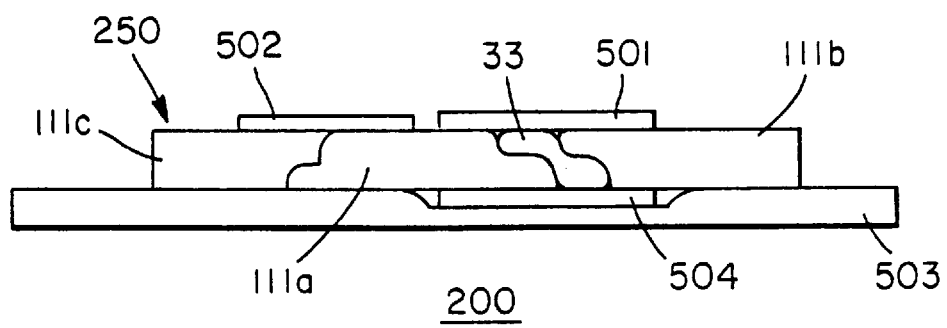
FIG. 8 is a side view of another preferred embodiment of the present inventive test strip utilizing a three webs and a membrane interposed between two of the webs.

In other embodiments, for example, as illustrated in FIGS. 5, 6 and 8, a device 200 includes a plurality of melt-blown substantially uniform fibrous webs 111a, 111b, and another porous medium 33 such as a microporous membrane, interposed between the fibrous webs 111a and 111b. Device 200 may include at least one additional melt-blown substantially uniform fibrous web 111c, upstream of web 111a, as shown in FIG. 8.

Preferably, an upstream uniform fibrous web 111a (FIGS. 5 and 6) or 111c (FIG. 8) includes a biological fluid application area or zone 250. Typically, with respect to the embodiments illustrated in FIGS. 5, 6, and 8, there is no binding agent or bond between the webs 111a, 111b and the medium 33, and the physical contact between the webs and medium 33 allows efficient fluid communication.

The device may include at least one additional medium, preferably at least one substantially impermeable structure or member, such as at least one nonporous medium. As illustrated in FIGS. 5, 6, and 8, device 200 includes additional media 501 and 504, and device 200 in FIGS. 6 and 8 also includes additional media 502 and 503. Preferably, these additional structures 501–504 are nonporous media, such as a nonporous plastic sheets or films. Structures 501–504 in device 200, and structure 2 in device 100 may comprise the same or similar media.

In some embodiments, an additional medium such as a nonporous medium 2, and 501–504, provides for decreased evaporation, e.g., as biological fluid, and more particularly, plasma, passes through a web and/or another porous medium. For example, at least one nonporous medium 501–504 decreases evaporation as plasma passes through uniform web 111c and/or 111a, and porous medium 33. Similarly, the nonporous medium 2 may decrease evaporation as plasma passes through web 1 and/or 11.

A nonporous medium may provide support for at least one porous medium, e.g., uniform web 111a, 111b, 111c, and/or porous medium 33, and/or provide maintained contact and allow efficient fluid communication between a plurality of media, e.g., between the fibrous webs 111a, 111b, and the porous medium 33, and/or between the fibrous webs 1 and 11.

At least one medium such as a nonporous medium may provide a defined application zone for contacting the melt-blown fibrous web with the biological fluid. Another advantage of utilizing a nonporous medium to provide a defined application zone is to improve the separation efficiency of the web, by allowing more of the sample to enter the interior of the web, and minimize surface wetting of the web.

Each of the components of the present inventive device are described in more detail below.

FIBROUS WEB

The present inventive device comprises one or more melt-blown fibrous non-woven webs which possess a substantially uniform structure, preferably comprising fibers such that the fibers have a diameter ranging from a minimum fiber diameter to a maximum fiber diameter which is no more than about three times the minimum fiber diameter. Such substantially uniform melt-blown fibrous non-woven webs are described in more detail in copending U.S. patent application Ser. No. 08/281,772.

In general, the melt-blown fibrous non-woven web which contains a region for receiving the biological fluid sample will possess a substantially uniform structure. While other fibrous webs which may exist in the present inventive device are preferably also of such a substantially uniform structure, this is less critical in many applications. Thus, for example, in the embodiments depicted in FIGS. 1–8, and 14–16, non-woven webs 1 and 111a have such substantially uniform structures. While the present inventive device can comprise other porous media which can be melt-blown fibrous non-woven webs, and while such other melt-blown fibrous non-woven webs, such as non-woven webs 11, 111b, and 111c of the embodiments depicted in FIGS. 4–8, and 15, need not have substantially uniform structures, such other porous media are preferably also substantially uniform melt-blown fibrous non-woven webs, particularly when such porous media are in fluid communication, either upstream or downstream, with a porous membrane which forms a part of the present inventive device.

The melt-blown fibrous webs of the invention preferably include fibers having a small average fiber diameter, more preferably in combination with a narrow fiber diameter distribution and a uniform weight distribution within the web. Embodiments of the melt-blown substantially uniform fibrous webs according to the present invention are substantially uniform with respect to at least one of, and more preferably, at least two of, fiber diameter, weight distribution when measured in both the longitudinal and transverse directions per unit of area, thickness, and voids volume. Additionally, embodiments of the webs according to the invention are substantially uniform with respect to freedom from roping, shot, twinning and striping.

As will be noted in more detail below, melt-blown substantially uniform fibrous webs according to the invention allow plasma or serum to be efficiently separated from a biological fluid such as blood, and allow the plasma or serum front to pass quickly and substantially evenly through the fibrous web. Additionally, embodiments of the invention allow a sufficient amount of plasma for a diagnostic test to be separated from a sample of less than about 20 μL of blood. For example, a sufficient amount of plasma for a diagnostic test can be separated from a sample of as little as about 10 μL of blood. Moreover, embodiments of the invention provide for efficient plasma separation from blood samples having a range of hematocrits, e.g., greater than about 30%. For example, efficient plasma separation can be obtained from blood samples having hematocrits in the range of about 34% to about 58% or more. Typically, blood samples placed in contact with devices according to the invention have hematocrits in the range of from about 38% to about 46%.

There are a variety of techniques for determining the plasma separation efficiency of fibrous webs produced in accordance with the invention, and a variety of types of blood samples may be evaluated by performing these determinations. A sample of blood may, for example, be obtained by a finger prick, microhematocrit tube, or withdrawn from a human or non-human by a syringe, or taken from donated blood, and placed in contact with the fibrous web.

Illustratively, using the configuration of the device in FIG. 1 for reference, the sample can be delivered to the porous web 1 at application area 150. When the sample is applied by contacting the web to a finger prick, the weight of the blood may be determined by weighing the device before and after application. Alternatively the blood volume may be measured using a pipette, or by other suitable means. The applied blood sample may be absorbed into the porous web of the device, after which a red cell front may be seen to travel lengthwise along the porous strip of web. After a short period, the red cells cease migrating while the colorless plasma continues to travel further along the length of the strip. The plasma containing portion may be used in or as a diagnostic device, for example to determine the proportion of a component of interest contained in the plasma, or for other useful purpose or purposes.

The weights or volumes of clear plasma collected and the efficiency with which the plasma was separated have been determined for the plasma separation devices of the invention by at least one of the methods described below.

In method #1, the tare weight of the device can be predetermined and the blood sample then applied as close as practically possible to one end of the strip. When migration is observed to cease, the device can be cut or otherwise separated to provide a section containing only clear plasma. The weight of the clear plasma collected can then be determined as follows:

(A) Calculate the weight of plasma collected
$W_1$=Tare weight of the test strip, grams.
$W_2$-Weight of the test strip after application of the blood sample; thus the weight of blood applied is ($W_2-W_1$).
$L_1$=Length of the test strip, cm.
$L_2$=Length of the section cut to contain only clear plasma.
$W_3$=Weight of the section cut to contain only clear plasma.

Then the tare weight of the section cut to contain only clear plasma is $$\frac{L_2 W}{L_1}$$

and the weight of the collected plasma is therefore $$W_4 = W_3 - \frac{L_2 W}{L_1}$$

(B) Calculate the efficiency with which the plasma was collected.

The weight $W_5$ of plasma in a blood sample of hematocrit H % and weight $W_2-W_1$ is $$W_5 = 100(W_2 - W_1) - \frac{H}{100}$$

The plasma collection efficiency is therefore $$\frac{100 W_4}{W_5} \%$$

In method #2 the cut off section containing the plasma can be weighed and then washed with saline, then with water, and then dried and reweighed to obtain the weight of the collected plasma.

In method #3 the efficiency of plasma collection may be defined as the length of the section wetted by plasma divided by the total length of the medium that is wetted by the blood sample and then multiplying by 100 to obtain the efficiency expressed as percent (%). The total length wetted by the blood sample is the sum of the length wetted by the plasma and the length wetted by the red blood cells.

The assay methods described above should be used with due care to minimize errors due to evaporation by limiting exposure of the specimens to the ambient atmosphere, thus reducing to a negligible level errors due to evaporation. Errors due to evaporation are minimized in the configuration illustrated in FIG. 16.

In any of the methods, the percentage of the original plasma collected by the device can then be calculated, providing that the hematocrit (H %) of the blood has been determined.

Efficient plasma separation can be obtained using, for example, a sample of less than about 20 μL of blood, even using a sample of about 10 μL of blood. In accordance with some embodiments of the invention, webs produced in accordance with the invention provide efficient plasma separation using a single layer of web. The webs of the present invention provide efficient plasma separation when the plasma flow is directed parallel to the fiber orientation, and directed perpendicular to the fiber orientation. When the length of the web is in the cross machine direction (CMD), the plasma tends to flow closer to parallel to the fiber direction. When the length of the web is in the machine direction (MD), the plasma tends to flow perpendicular to the fiber orientation.

Illustratively, a web can be produced as described in copending U.S. patent application Ser. No. 08/281,772, such that 90% of the fibers have a diameter ranging from a minimum fiber diameter to a maximum fiber diameter which is no more than about three times the minimum fiber diameter. The length of the web can be in the machine direction, or in the cross machine direction. After contacting the web with blood having a hematocrit of, for example, about 38% to about 45%, the plasma collection efficiency is typically greater than about 15%, using either type of web. In some embodiments, the plasma collection efficiency can be greater than about 25% using either type of web.

Preferably, with respect to flow parallel to the fiber orientation, the plasma collection efficiency can be greater than about 30%, and can be greater than about 40%. With respect to flow perpendicular to the fiber orientation, the plasma collection efficiency preferably can be greater than about 20%, and in some embodiments, the efficiency can be greater than about 25%.

Since different embodiments of the invention include passing the plasma or serum through regions of the web having one or more preplaced reagents, including soluble reagents, and/or passing the fluid through a plurality of porous media, the melt-blown substantially uniform fibrous webs according to the invention provide an optimum range of lateral flow times (LFTs) for the desired embodiment. Illustratively, while plasma passes quickly through the fibrous web ahead of, for example, the red blood cells, the LFT should be not so small as to fail to dissolve a preplaced reagent and/or to fail to allow a sufficient amount of plasma to separate from the red cells. Additionally, consistent with the dissolution time or similar requirements, the LFT should be as small as possible in order to allow the user of the test to reach a conclusion as quickly as possible.

Of course, the uniform structure of webs according to the invention also make them suitable for processing already separated plasma or serum, since the separated plasma passes quickly and substantially evenly through the fibrous web.

In accordance with the invention, the melt-blown fibrous webs include fibers having a substantially uniform fiber diameter, e.g., wherein 90% of the fibers of the web have a diameter ranging from a minimum fiber diameter to a maximum fiber diameter which is no more than about three times the minimum fiber diameter, e.g., a maximum fiber diameter no more than about 2.5 times the minimum fiber diameter, or a maximum fiber diameter no more than about 2.2 times the minimum fiber diameter.

In a more preferred embodiment, 90% of the fibers of the web have a diameter ranging from a minimum fiber diameter to a maximum fiber diameter which is no more than about two times, e.g., a maximum fiber diameter no more than about 1.8 times the minimum fiber diameter, or a maximum fiber diameter no more than about 1.6 times the minimum fiber diameter.

In some embodiments, 90% of the fibers of the web may have a diameter ranging from a minimum fiber diameter to a maximum fiber diameter which is no more than about 1.5 times the minimum fiber diameter.

In accordance with the invention, webs can be produced including fibers having a selected substantially uniform fiber diameter. For example, webs can be produced according to the invention including fibers having an average fiber diameter in the range of about 0.5 $\mu$m or less, to about 20 $\mu$m or more. More preferably, the average fiber diameter is in the range of about 0.7 $\mu$m to about 10 $\mu$m, even more preferably, about 0.7 $\mu$m to about 4 $\mu$m.

In one embodiment, a web according to the invention comprises fibers having an average fiber diameter of less than about 2 $\mu$m. For example, webs according to the invention include fibers having an average fiber diameter of about 1.9 $\mu$m, about 1.8 $\mu$m or about 1.6 $\mu$m.

In another embodiment, the fibers have an average fiber diameter of about 1.5 $\mu$m or less, and in some embodiments, about 1 $\mu$m or less. Illustratively, webs according to the invention comprises fibers having an average fiber diameter of about 1.3 $\mu$m, about 1.1 $\mu$m, or about 0.9 $\mu$m.

Of course, in some embodiments including two or more fibrous webs, at least two of the webs may have include fibers having different average fiber diameters.

The fiber diameter is determined in accordance with copending application Ser. No. 08/281,772.

In a preferred embodiment, melt-blown webs according to the invention include a substantially uniform weight distribution, e.g., varying by less than 1% over a unit area. In some embodiments, the weight distribution varies by less than about 1% when measured in both the longitudinal and the transverse directions, with such weight distribution measured along 0.64×13 cm areas and on 2.54 cm squares.

Webs produced in accordance with the invention can have a variety of basis weights. Illustratively, the basis weight may be in the range from about 1 g/ft$^2$ or less to about 50 g/ft$^2$ or more. More preferably, the basis weight is about 20 g/ft$^2$ or less, for example, in the range from about 2 g/ft$^2$ to about 12 g/ft$^2$. Typical basis weights include about 3 g/ft$^2$, about 4 g/ft$^2$, about 5 g/ft$^2$, or about 6 g/ft$^2$. Of course, in some embodiments including two or more fibrous webs, at least two of the webs may include different basis weights.

The present inventive melt-blown fibrous non-woven web is preferably also substantially free of roping, twinning, striping, and shot, and can be characterized by a tensile strength in a first direction at least about 1.5 times, preferably at least about 2 times, and more preferably at least about 4 times, the tensile strength in a second direction 90° to the first direction.

With respect to the lateral flow time (LFT), one protocol for determining the lateral diffusion of the present melt-blown webs is described in copending U.S. patent application Ser. No. 08/281,772, utilizing a suspension of blue dyed polystyrene spheres in water as follows:

A suspension of blue dyed polystyrene spheres in water was obtained from Bangs Laboratories, Carmel, Ind., specified as "uniform latex dyed microspheres, color=Blue A1, polystyrene, mean diameter=0.3 $\mu$m". Prior to use in the test, the concentration of the microspheres was reduced to 0.04% by adding one part of the suspension to 250 parts of water.

Figure 12:
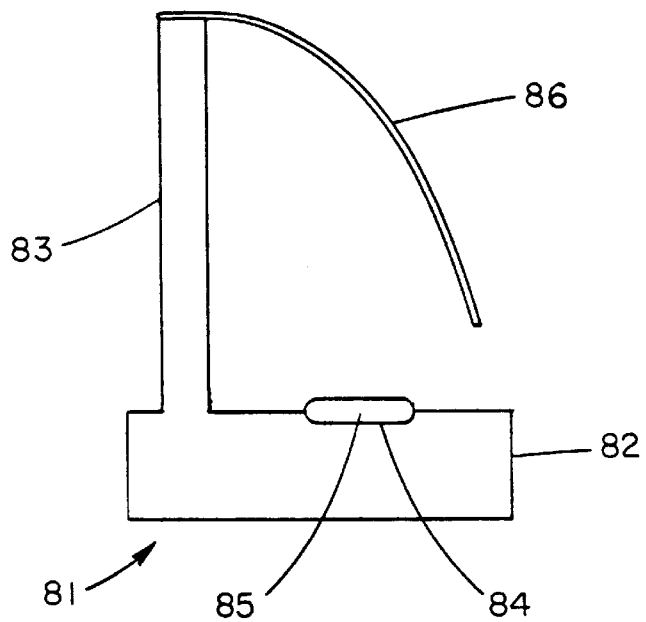
FIG. 12 is an elevation view of an apparatus to measure lateral flow times of materials such as the melt-blown fibrous web prepared in accordance with the present invention.

To perform the test, an apparatus generally in conformance with FIG. 12 is provided. FIG. 12 is an elevation view of a transparent plastic test device 81 comprising a platform 82, an upright post 83, and a shallow cavity 84. Two hundred microliters of the test suspension is placed in cavity 84, thereby forming pool 85. A test strip 86 is cut to 0.5×7 cm from the non-woven web to be tested, and marked near one edge at 1, 3, and 5 cm from one end. The unmarked end of the test strip is then fastened to the top of post 83, thus cantilevering the marked end in the air above platform 82. Using tweezers, the cantilevered end of the test strip 86 is dipped into the center of pool 85, in which it is retained by capillarity, and the times are measured for the advancing front(s) to travel 2 cm, from the 1 cm to the 3 cm mark, and the time to travel 4 cm, from the 1 cm mark to the 5 cm mark.

Depending on the nature of the substrate, the blue spheres may advance coincidentally with the liquid front, or the blue spheres may be retarded, in which case a separate blue front is observed, and there is a gap between the blue front and the liquid front. If the blue spheres have reached the 4 cm mark at the same time as the liquid (i.e., the advancing fronts coincide) the "lag" is recorded as zero; if the blue spheres lag behind and have not fully advanced, the magnitude of the lag at 4 cm is recorded accordingly. A lag of more than about 1 mm is undesirable, and a zero lag is highly preferred for proper functioning of a diagnostic test.

In some embodiments, the present inventive melt-blown fibrous non-woven web can be further characterized by a 2 cm lateral flow time of about 40 seconds or less in a first direction and/or a 4 cm lateral flow time of about 225 seconds or less in a first direction. Such webs can be prepared wherein the lateral flow time in a second direction 90° to the first direction is different than the lateral flow time in the first direction. Moreover, such webs can be prepared such that the web exhibits substantially no bead front lag in the first and/or second directions.

In more preferred embodiments, the webs according to the invention have a 2 cm LFT of about 40 seconds to about 10 seconds in a first direction and/or a 4 cm LFT of about 225 seconds to 45 seconds in a first direction. Even more preferably, the webs have a 2 cm LFT of about 35 seconds to about 12 seconds in a first direction and/or a 4 cm LFT of about 200 seconds to 64 seconds in a first direction.

The melt-blown substantially uniform fibrous webs of the present invention preferably have a substantially uniform voids volume. In some embodiments, e.g., where it is desirable to obtain a specified range of LFTs, the webs according to the invention can be produced with a preselected substantially uniform voids volume to obtain a desired LFT.

In accordance with the invention, the present melt-blown webs preferably have a substantially uniform voids volume of at least about 40%, e.g., in the range of from about 45% to about 98%. In some embodiments, the present melt-blown webs have a substantially uniform voids volume in the range of from about 60% to about 94%, more preferably, in the range from about 65% to about 90%. Illustratively, melt-blown webs in accordance with the invention can have substantially uniform voids volumes in the range from about 70% to about 85%, e.g., about 74%, about 77%, about 78%, about 80%, about 82%, or about 85%.

In some embodiments, melt-blown webs in accordance with the invention can have a substantially uniform voids volume in the range of about 75% to about 85%, more preferably, in the range of about 77% to about 83%. In one embodiment, melt-blown webs in accordance with the invention have a substantially uniform voids volume in the range of from about 78% to about 81%.

Of course, in some embodiments including two or more fibrous webs, at least two of the webs may have different voids volumes.

The voids volume may be determined as described in copending U.S. patent application Ser. No. 08/281,772. The data required to determine voids volume include the weight of the sheet per unit area, the density of the fiber, and the thickness of the sheet. Measurement of thickness is not straightforward because the media are compressible, which can cause large errors if inappropriate equipment is used. In the invention, thickness gauges were used in which a 7.62 cm diameter aluminum foot is attached to a gauge with 0.0001 inch (0.00025 cm) graduations. The gauge with its foot is mounted on a horizontal U shaped frame comprising on its lower arm a flat surface against which the foot rests. The gauge foot was actuated downward by a 60 gram force spring, which together with the 80 gram weight of the foot exert a compressive force on the test specimen of 140 grams, or 3.1 g/cm². This force compresses even the loftiest and most easily compressed of the media of the invention by less than about 1%.

The voids volume was then calculated in % as $$\% \text{ voids} = (t - W/\rho)t^{-1} \times 100$$

where t=thickness (cm), W=weight (g/cm²), and ρ=density of the fiber (g/cc).

Melt-blown substantially uniform fibrous webs according to the invention preferably have a substantially uniform thickness. Illustratively, webs according to the invention include thicknesses in the range of from less than about 0.008 cm to about 0.5 cm or more.

In some embodiments, while the fibrous web includes a substantially uniform voids volume, a portion of the web may be compressed to improve the efficiency of processing. Accordingly, a section or portion of the web may include a different voids volume than the rest of the fibrous web.

For example, as shown in FIG. 3, web 1 may include a compressed section 10. Illustratively, while the area of the web that is not compressed, e.g., to the left of section 10, has a substantially uniform voids volume, e.g., about 75%, the area of the web within section 10 has a smaller voids volume, e.g., less than about 60%. As will be noted in more detail below, in some embodiments such as that depicted in FIG. 3, wherein another medium 3 such as a microporous membrane is arranged downstream of the web, and a portion 5 of the medium 3 extends beyond the edge of the web 1, a sample of biological fluid, e.g., a drop of fingerstick blood, is placed in contact with the fibrous web 1 at biological fluid application zone 150. As the blood passes downwardly, and the plasma front passes ahead of the red cells, separated plasma passes through the second surface 44 of the web 1, into the medium 3, and horizontally into the cantilevered section, portion 5 of the medium 3. However, the compressed section 10 prevents blood cells from seeping laterally through web 1 onto the portion 5 of the medium 3. In some embodiments, a portion of the compressed section 10 can be rendered hydrophobic, to further minimize the seepage of cellular material laterally through the web.

The fibrous web is preferably treated for increased efficiency in processing a biological fluid. For example, the web may be surface modified to affect the critical wetting surface tension (CWST) of the element. CWST is described in U.S. Pat. No. 4,880,548. Preferably, webs according to the invention have a CWST of greater than about 65 dynes/cm, more preferably, greater than about 72 dynes/cm.

In some embodiments, webs according to the invention include a CWST of about 74 dynes/cm or greater, e.g., about 80 dynes/cm or greater, or about 90 dynes/cm or greater, or about 100 dynes/cm or greater.

Illustratively, webs according to the invention include a CWST in the range of about 74 to about 78 dynes/cm. In other embodiments, webs according to the invention include a CWST in the range of about 80 to about 90 dynes/cm, e.g., about 82 to about 88 dynes/cm. In still other embodiments, webs according to the invention include a CWST of about 92 to about 98 dynes/cm. In other embodiments, webs have a CWST of about 100 dynes/cm or greater, e.g., in the range of about 105 to about 115 dynes/cm or greater.

In some embodiments, e.g., where it is desirable to obtain a specified range of Lateral Flow Times (LFTs), the webs according to the invention may be produced having a preselected CWST to obtain a desired LFT. In some embodiments including two or more fibrous webs, at least two of the webs may be produced with different CWSTs to obtain different desired LFTs.

Surface characteristics of the web can be modified by chemical reaction including wet or dry oxidation, by coating or depositing a polymer on the surface, or by a grafting reaction. Grafting reactions may be activated by exposure to an energy source such as gas plasma, heat, a Van der Graff generator, ultraviolet light, electron beam, or to various other forms of radiation, or by surface etching or deposition using a gas plasma treatment. With respect to gas plasma treatments, typical processes utilize, for example, oxygen plasma, or a mixture of ammonia plasma and the plasma of an inert gas such as Argon.

In some embodiments of the invention, the CWST may be modified as described in U.S. Pat. Nos. 4,880,548; 4,925,572; 5,152,905; and 5,258,127, and International Publication No. WO 93/04673.

In another embodiment, a gas plasma grafting process, as described in copending U.S. patent application Ser. No. 08/281,772, provides, among other advantages, a grafting system with a total time to presentation of the dry grafted product in less than about three minutes. This preferred process can take place completely in the gas phase.

In this grafting procedure, the CWST is raised to above 73 dynes/cm by a two or three step process comprising (a) exposing the porous medium, e.g., the web, for about 10 to 30 seconds to a plasma of an inert gas, such as Helium, Neon, or Argon at about 20 to 700 $\mu$m Hg, (b) optionally evacuating the chamber to a pressure of less than about 5 $\mu$m Hg, and then (c) introducing into the chamber a monomer such as liquid hydroxypropyl methacrylate or other unsaturated monomer presenting a hydroxyl group and holding for a period of about 30 seconds or more, during which at least a portion of the hydroxypropyl monomer evaporates, thereby contacting the porous medium and reacting as a vapor to accomplish grafting of the fiber surfaces. After evacuation followed by filling the chamber with air, the grafted polymer, may be removed and used without further processing or may be subjected to washing, e.g., water washing, to remove any unbound residual material (e.g., contaminants which were present in the monomer composition). Weight gain depends on the surface area of the porous medium. A typical value is in the range of up to about 5 to 10%. The temperature during the operation may remain essentially at the ambient. Preferred monomers include hydroxypropyl acrylate (HPA) and hydroxy ethyl methacrylate (HEMA), along with other similarly functional monomers which are known to those familiar with the art of grafting. In a variation of the above described procedure the unsaturated monomer may be used to form a plasma in step (a) in place of the inert gas, with similar end results.

Unlike other grafting procedures known to those familiar with the art, the CWST produced with HPA and HEMA is 74 to 76 dynes/cm over a wide range of concentrations and times of exposure when used to treat hydrophobic polyester substrates. Other resins can be similarly converted to form fibrous porous media and then hydrophilized as described above.

Other means to achieve a permanent graft include cobalt 60 irradiation, UV exposure, or electron beam, in each case followed by exposure to an aqueous solution of a suitable monomer, which could for example be an acrylic alcohol, which must then be followed by washing and drying.

In accordance with the invention, the melt-blown webs may be prepared from a wide variety of synthetic polymeric materials, including, for example, polybutylene terephthalate (PBT), polyethylene, polyethylene terephthalate (PET), polypropylene, polymethylpentene, polychlorotrifluoroethylene, polyphenyl sulfide, poly(1,4-cyclohexylene dimethylene terephthalate), PETG (a polyester polymerized with an excess of glycol), nylon 6, nylon 66, nylon 612, nylon 11, and a nylon 6 copolymer described as "80% nylon 6 with 20% polyethylene-oxide-diamine."

Particularly suitable melt-blown substantially uniform fibrous webs include those produced in accordance with copending U.S. patent application Ser. No. 08/281,772. Illustratively, in accordance with the copending application, molten resin is attenuated into fibers by a high velocity stream of gas (usually air) and collected on the surface of a rotating and translating cylinder. The cylinder, hereinafter referred to as the collector, is generally rotated at a surface velocity in the range of at least about 20 m/min and less than about 600 m/min. With respect to translation, the collector is preferably translated at a rate less than about 2 cm /revolution, more preferably, less than about 1 cm /revolution, even more preferably, less than about 0.75 cm /revolution.

Preferably, while preparing the melt-blown fibrous web, the distance between the fiberizing nozzle tip and the target collecting surface is less than about 10 cm, e.g., about 2 cm to about 8 cm; more preferably, about 2 cm to about 5 cm. In one embodiment, the web is prepared utilizing two parallel rows of linearly arranged, substantially equally spaced nozzles to form fibers onto the surface of a collector having a longitudinal axis arranged parallel to the rows of nozzles, wherein the rows of nozzles are offset from each other and are angled toward each other.

In a preferred embodiment, the present invention employs self-contained individual fiberizing nozzles comprising an annular air passage. Even more preferably, the self-contained fiberizing nozzles are capable of making fibrous sheet media with average fiber diameters less than about 1.0 $\mu$m, and can be operated in the die-to-collector collector distance (DCD) range of about 2.5 to about 9.0 cm, and can make product with controlled orientation of the fibers.

Figure 9:
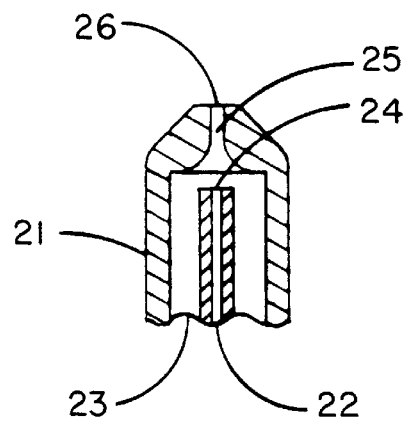
FIG. 9 is a cross-sectional view of a preferred fiberizing nozzle.

Such a fiberizing nozzle is depicted in FIG. 9, wherein the fiberizing nozzle 21 contains a capillary 22 through which the resin is pumped and a circular annulus 23 through which hot air is delivered. The pumped resin exits the capillary 22 into the resin disruption zone 24 and then into the nozzle channel 25 where the resin, now fragmented into tiny droplets, is carried in the air stream out of the nozzle tip 26.

Because the air supply is used more efficiently and is correspondingly less in proportion to the weight of the product web, the fiberized product of the present invention can be collected as a web by impinging it on a solid collecting surface, as opposed to, for example, an apparatus utilizing a vacuum backed screen. In another marked improvement on the prior art, the DCD (distance between the nozzle tip and the target collecting surface) may be shortened to under about 5.5 cm, e.g., about 2.5 to about 5.5 cm, thereby reducing the width of the fiber stream and further improving fiber collection efficiency.

Figure 10C:
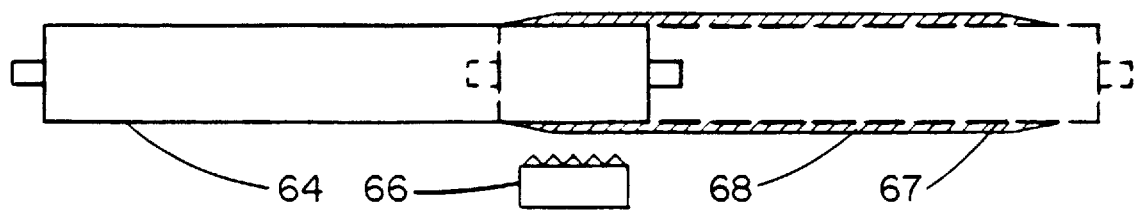
FIG. 10C is a side view of a melt-blowing apparatus showing the translation of the collecting cylinder.
Figure 10B:
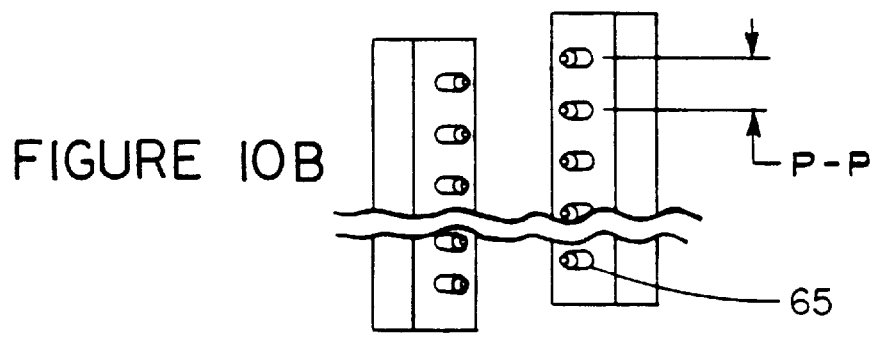
FIG. 10B is a top view of the same apparatus as seen along line A—A of FIG. 10A.
Figure 10A:
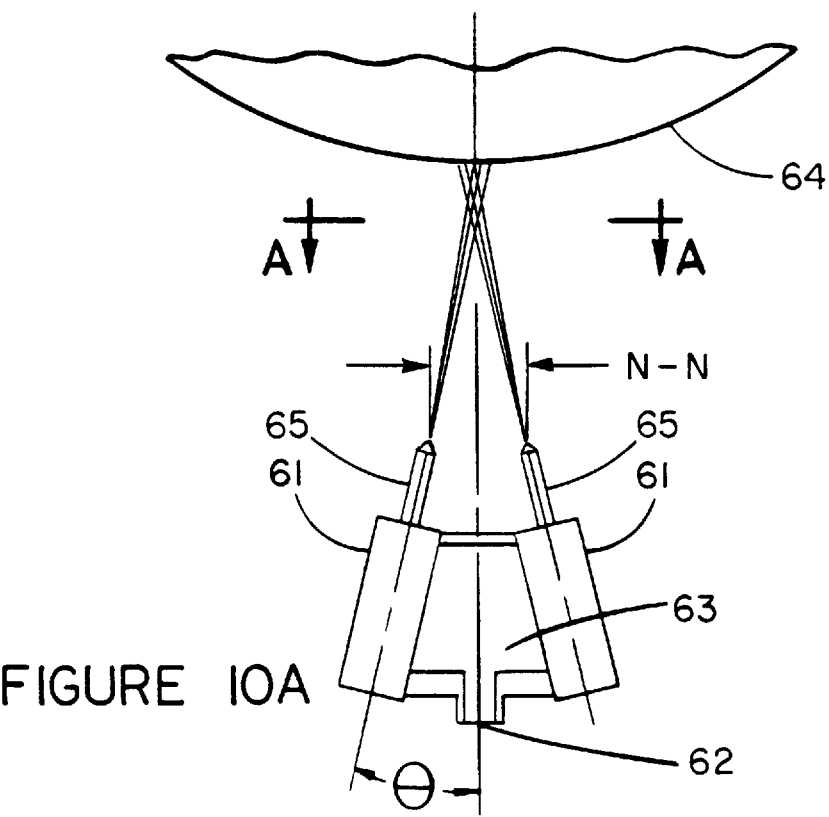

In one embodiment, as illustrated in FIGS. 10A–10C, a plurality of fiberizing nozzles 65 are connected to double manifolds 61. One portion of each manifold 61 is arranged to supply molten resin to the nozzles from an extruder, and the other portion is arranged to supply heated air at controlled temperature and pressure. The area between the two manifolds has been enclosed at the bottom and at both ends to form a cavity 62 fitted at its lower end with a cylindrical opening 63. FIG. 10B is a partial view along line A—A in FIG. 10A, showing tilted nozzles 65 located on P—P centers, the nozzles of the one row offset by 0.5 P from those of the other row. FIG. 10C shows in elevation view a crossed stream fiberizer assembly 66 located near to the right end of collector cylinder 64.

In use the fiberizer assembly 66 is stationary while collector cylinder 64 is rotated, for example at a surface velocity in the range of about 20 to 600 meters per minute, and may be simultaneously translated in the range of about 0.01 to about 0.3 cm per revolution. The rotation and translation rates are maintained constant while collector cylinder 64 is moved across the fiberizer to position 67 shown in broken lines, in the course of which a fibrous web 68 is formed by the impinging fibers. The web grows in length until the translation is complete and the whole surface of the collector cylinder is covered. The cylinder of web may then be slit along its length, its ends trimmed, and removed from the cylinder. The so formed sheet may be inspected on a light box where it is seen to be uniform and free of any visually detectable striping.

Webs can be prepared using a single pass across the collection cylinder; however, multiple passes may be used by reciprocating the collection cylinder to the end of its stroke and back, often to advantage, for example when collecting thick webs, where the use of multiple passes provides the ability to adjust the DCD to allow for the thickness of the medium collected. In this way webs, or perhaps more accurately battings, of uniform structure up to one or more centimeters in thickness may be made.

If while using the crossed fiber streams of the invention the translation per revolution (hereinafter T/R) is increased above 0.1 cm per revolution in about 0.04 cm or smaller increments while holding constant a given combination of fiberizing nozzle dimensions, nozzle placement, DCD, mandrel diameter, mandrel rotation rate, and resin composition, arid each so made specimen is then examined sequentially on a light box, a T/R will be reached at which the existence of parallel stripes in the product becomes readily apparent. By then backing off from that T/R by about 0.04 cm, a product of excellent uniformity is produced, and such a product is encompassed by the present invention. Products made using the crossed fiber streams of the invention which show faint or moderate striping may still be superior with respect to uniformity when compared with products of any previous melt-blowing method; such products are also encompassed by the present invention.

The magnitude of the T/R which produces a stripe-free product is influenced by factors including the nozzle-nozzle spacing, which is preferred to be as small as is practical; fiberizing die assemblies with a 0.76 cm nozzle center to nozzle center spacing have been used to produce the examples of the invention, as preceding tests using similar apparatus spaced on 1.02 cm spacing were less successful. Under some circumstances, for example when operating with very large DCD's, stripe-free products may be obtained with nozzle spacing well over 1 to 2 cm, and such products fall within the scope of the present invention. Nozzle to nozzle spacing less than 0.76 cm is desirable and may be possible, albeit such reduction would be somewhat restricted by design considerations such as the dimension of air and resin flow passages. Other criteria for achieving perfect uniformity are that rates of revolution, translation, and resin delivery must be constant throughout the formation of the entire length of the sheet.

Additional Media

Preferably, devices according to the invention include at least one additional medium, more preferably, two or more media, associated with the melt-blown substantially uniform webs of the invention. For example, devices according to the invention can include at least one medium downstream of the melt-blown substantially uniform fibrous web 1, 11, 111a, or 111c (as illustrated in, for example, FIGS. 1, 4–6, 8, and 14–16 respectively). Of course, in some embodiments, devices according to the invention can include one or more media upstream of the melt-blown substantially uniform fibrous webs. A variety of additional media are suitable for use in the present invention, as will be noted in more detail below.

A device according to the invention may include at least one porous medium downstream of the melt-blown substantially uniform fibrous web to allow plasma or serum to pass from the fibrous web into, and possibly through, the downstream medium or media. Similarly, a device according to the invention may include at least one porous medium upstream of the melt-blown substantially uniform fibrous web to allow plasma or serum to pass from the upstream medium or media into, and possibly through, the downstream fibrous web.

Alternatively, or additionally, the device may include at least one nonporous medium upstream, downstream and/or otherwise associated with the fibrous web to provide, for example, at least one of decreased evaporation and support. In some embodiments, at least one nonporous medium maintains contact between a plurality of media. The nonporous medium can be configured so as to provide a defined application zone for contacting the melt-blown substantially uniform fibrous web with the biological fluid.

With respect to those embodiments including the use of at least one additional porous medium, suitable media include membranes, preferably microporous membranes. In some embodiments, the membranes are hydrophilic.

A variety of membranes are suitable for use in accordance with the invention. Suitable membranes include, but are not limited to any conventional membrane utilized in diagnostic procedures, e.g., to determine the presence of at least one analyte such as glucose, cholesterol, and serum enzymes. Other suitable membranes include but are not limited to virus removing or separating membranes.

Suitable membranes include nylon 66 membranes, particularly those produced in accordance with U.S. Pat. No. 4,340,479; and virus removing or separating membranes, particularly those produced in accordance with copending U.S. patent application Ser. No. 07/882,473, filed May 13, 1992; and those produced in accordance with copending U.S. patent application Ser. No. 08/327,622, filed on Oct. 24, 1994; which are incorporated by reference in its entirety.

Exemplary virus removing membranes include ultrafiltration/diafiltration membranes that are produced in accordance with copending U.S. patent application Ser. No. 07/882,473, and are capable of excluding 0.02 $\mu$m diameter, monodisperse, latex particles and are capable of being dried without loss of such ultrafiltration properties and which after being wet/dry cycled at least once will have a $K_{UF}$ flow rate at 10 psi, using 1-butanol saturated with water as the wetting liquid and water saturated with 1-butanol as the displacing liquid at ambient temperature, below 50 cc/min per square foot of membrane. Suitable ultrafiltration/diafiltration membranes produced in accordance with U.S. patent application Ser. No. 07/882,473 include polysulfone membranes, such as polyethersulfone or polyphenyl sulfone membranes, particularly those having a molecular weight cutoff rating from about 1,000 daltons to about 20,000 daltons, and those having a molecular weight cutoff rating from about 20,000 to 200,000 daltons and capable of excluding monodisperse latex particles greater than about 40 nanometers in diameter.

Other exemplary virus removing membranes include isotropic, skinless, polyvinylidene fluoride membranes, particularly such porous membranes which have a titer reduction of at least about $10^8$ against $T_1$ bacteriophage and/or a $K_{UF}$ of at least about 15 psi when tested using liquid pairs having an interfacial tension of about 4 dynes/cm.

The $K_{UF}$ test method is described in U.S. patent application Ser. No. 07/882,473, filed May 13, 1992. In accordance with the $K_{UF}$ test method, the membrane to be tested is first thoroughly wetted with a wetting liquid that is capable of fully wetting the membrane. A displacing liquid, which is immiscible with the wetting liquid used to wet the membrane but has a low, stable interfacial tension, is placed in contact with the upstream side of the wetted membrane. Pressure is then incrementally applied to the displacing liquid, and the flow of the displacing liquid through the membrane is measured as a function of the applied pressure. The displacing liquid should be stable but not miscible with the wetting liquid, and the interfacial tension between the two liquids should be about 10 dynes/cm (10 mN/m) or less. Controlling the interfacial tension to less than 10 dynes/cm (10 mN/m) allows fluid displacement to be achieved at much lower pressures than in similar testing normally performed with a water/air interface (i.e., in the $K_L$ or bubble point test methods). In addition, it is important that the interfacial tension between the two liquids remain constant during the test procedure. A plot of the flow rate of displacing liquid, per unit area of the membrane, through the membrane as a function of applied pressure can be made, and a straight line can be drawn through the steep part of the resulting curve, using regression analysis, which will intersect the horizontal axis at a given pressure value. This point of intersection is deemed the $K_{UF}$ value and is directly related to the pore size of the membrane. Since there is no diffusive flow through a membrane which is free of defects, the flow rate of the displacing liquid through the membrane prior to the $K_{UF}$ value is zero, i.e., a flat line in the typical plot of flow rate versus pressure.

In a preferred embodiment, at least one porous medium is arranged downstream of a melt-blown substantially uniform fibrous web, so that fluid, e.g., plasma, may be passed from the web into the downstream porous medium or media.

For example, with respect to FIGS. 3 and 14, additional medium 3 is preferably a microporous membrane arranged downstream of melt-blown substantially uniform fibrous web 1. Similarly, with respect to FIGS. 5 and 6, porous medium 33, which is preferably a microporous membrane, is arranged downstream of melt-blown substantially uniform fibrous web 111a. In some embodiments, the additional medium comprises another melt-blown substantially uniform web. Thus, as shown in FIG. 8, additional melt-blown substantially uniform fibrous web 111a is arranged downstream of melt-blown substantially uniform fibrous web 111c. Similarly, as shown in FIG. 15, additional melt-blown substantially uniform fibrous web 11 is arranged downstream of melt-blown substantially uniform fibrous web 1. As will be noted in more detail below, the downstream porous medium or media preferably provide(s) a higher capillary attraction for the plasma than that of the upstream medium for the plasma. Accordingly, plasma may be passed efficiently from the web 1, 11, 111a, and 111c, in the embodiments illustrated in FIGS. 3–6, 8, 14, and 15.

In the embodiments illustrated in FIGS. 3 and 14, wherein medium 3 comprises a porous medium such as a microporous membrane, more preferably a hydrophilic membrane, even more preferably a hydrophilic nylon membrane (FIG. 3), or a PVDF membrane (FIG. 14), medium 3 is arranged downstream of the melt-blown substantially uniform fibrous web 1.

Medium 3 preferably comprises a porous medium as it may be filled with the plasma passing through the fibrous web 1. For example, porous medium 3 can have a pore structure that prevents the penetration of red blood cells into the medium. Thus, at the junction between the fibrous web 1 and the porous medium 3, the porous medium 3 can act as a filter to separate red blood cells from the plasma, and the plasma can diffuse rapidly into the medium 3.

Second surface 44 of web 1 and first surface 54 of medium 3 may substantially overlap. In some embodiments, as shown in FIGS. 3 and 14, a portion 5 of medium 3 may extend beyond the web 1. Illustratively, with respect to FIG. 3, the medium 3 may be at least about twice the length of the web 1, e.g., about 2 to 5 times the length of the web 1, so that portion 5 is about the same length as the web 1. Additionally or alternatively, the medium 3 can be wider than the web 1 to produce portion 5.

With respect to FIG. 14, medium 3 may be more than about twice the length and/or width of the web 1. In one embodiment according to FIG. 14, the web 1 includes a sample application area of about 5 mm×5 mm, and the medium 3 has a width of at least about 3 times the width of the web 1 to allow the plasma to pass into the membrane (medium 3) in less than about 10 seconds.

Of course, with respect to FIGS. 1, 2, and 16, for example, wherein structure 2 comprises a nonporous medium, the analyte can be detected after the plasma passes laterally through the fibrous web 1.

In the embodiments illustrated in FIGS. 3 and 14, the web 1 and medium 3 are preferably bound together by a binding agent such as a fibrous resin bond. The fibrous bond system can be very flexible with respect to the strength of the bond, which can be varied by changing the number and the fiber diameter of the fibers which upon softening by, for example, heating, accomplish bonding. Thus, the bond can be adjusted to permit web 1 and medium 3 to be easily separated at a desired time. For example, once plasma has passed into the medium 3, web 1 may be separated therefrom, and the plasma in medium 3 may be further processed. Since the may rated web may be discarded before further testing of the plasma, this may decrease the risk of exposure to blood transmitted disease(s).

Preferably, in those embodiments wherein medium 3 comprises a porous medium, at least a portion of the medium 3 is bound to the fibrous web by a binding agent such as fibrous resin bond, interposed between the second surface 44 of the fibrous web 1 and the upstream surface 54 of the medium 3, as shown in, for example, FIG. 3. Similarly, with respect to the embodiment illustrated in FIG. 4, fibrous webs 1 and 11 may be bound via a fibrous resin bond.

Figure 11:
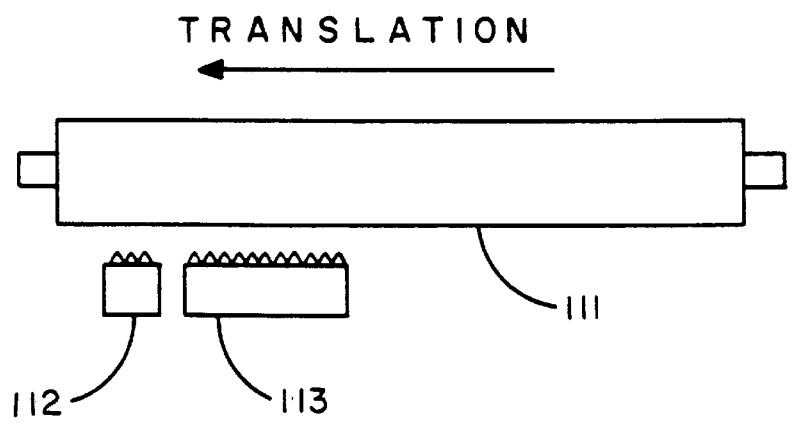
FIG. 11 is a side view of a melt-blowing apparatus useful in the preparation of webs in accordance with the present invention.

Illustratively, when using two or more fiberizers as described in copending U.S. patent application Ser. No. 08/281,772, one of the fiberizers can be used to prepare the melt-blown web, and another fiberizer can deposit binding resin fibers on the melt-blown web as it is being formed on the collector. Accordingly, in one method for accomplishing the bonding of two layers, the binder fiber is deposited on the melt-blown web in the same operation in which the web is formed, using an arrangement such as that shown in FIG. 11, in which the smaller of the two fiberizers 112 and 113 deposits binder fiber on a web as it is being formed on the collector cylinder 111, all during a single traverse of the target cylinder 111 as it travels in the direction of the arrow.

For example, a low melting resin is fiberized with the resin delivery and scanning rates adjusted to deposit preferably about 1 to 20 g/m² of bonding fiber about 2 to about 10 $\mu$m in fiber diameter, or more preferably, about 2 to 5 g/m² of bonding fiber about 3 to about 7 $\mu$m in diameter. The bonding fibers are impinged on either or both of the surfaces to be attached.

The fiber diameters and the weight per unit area of the binder fiber are such as to cover between about 1 to 30% of the area of the surface to which it is applied, and preferably between about 1 and 10% of the surface, and more preferably between about 2 and 5 percent of the surface, the more preferred range leaving about 95 to 98% open the surface on which the binder fibers were deposited. In this manner, transfer of plasma by capillarity between the porous web and the membrane is free to proceed rapidly, while assuring that the two layers are well adhered to each other, and, because only gentle compression has been used, the two layers need not have been significantly reduced from their starting thicknesses or indeed not reduced at all.

Thus, a resin can be fiberized and deposited on the second surface 44 of the web 1 and/or the upstream surface 54 of the medium 3, and heated for a short time, e.g., less than about 10 seconds, to melt the resin without softening the surfaces of the web and medium 3. Preferable resins include those having a glass transition temperature below ambient temperature. The web and medium can be gently compressed, and the heat removed, to provide an effective and permeable bond. While a variety of resins are suitable, polyethylene or PETG are preferred.

In other embodiments, as illustrated in FIGS. 5 and 6, a porous medium 33, more preferably, a microporous membrane, is arranged downstream of the web 111a. As with some of the embodiments previously described with FIGS. 3 and 14, the downstream porous medium may be filled with the plasma, without red blood cells passing into the medium. However, unlike the embodiments illustrated in FIGS. 3 and 14, there may be no adhesive or fibrous resin bond between the porous medium 33 and the fibrous webs 111a, 111b in the embodiments shown in FIGS. 5 and 6. Illustratively, as shown in FIGS. 5 and 6, at least one nonporous medium 501 and/or 504, such as a plastic film including an adhesive, maintains the position of porous medium 33 between fibrous webs 111a and 111b, without a bond between web 111a and 33, and without a bond between 33 and web 111b. In a preferred embodiment, porous medium 33 is maintained in position between fibrous webs 111a and 111b so that bypassing of medium 33 is minimized or prevented. For example, there should be a distance between fibrous webs 111a and 111b so that the webs fail to contact one another, while remaining in fluid communication with each other through interposed porous medium 33. Similarly, with respect to the embodiment illustrated in FIG. 8, porous medium 33 is preferably interposed between fibrous webs 111a and 111b without a resin bond between 33 and the webs 111a and 111b. Preferably, there is no bond between fibrous webs 111c and 111a. For example, at least one nonporous medium including an adhesive, more preferably two nonporous media 502 and 503, each including an adhesive, maintain(s) webs 111c and 111a in fluid communication with each other.

In some embodiments, wherein the media 3 and 33 include a pore structure that blocks the passage of red and white blood cells, e.g., an absolute pore size of about 2 $\mu$m or less, more preferably, about 0.5 $\mu$m or less, even more preferably, about 0.2 $\mu$m or less, the plasma entering the media 3 and 33 is essentially cell-free.

Another advantage to the use of media 3 and 33 with the pore structure as summarized above is that the media will provide a capillary attraction for the plasma that is higher than that of the fibrous web. Accordingly, this finer pored membrane allows plasma to be effectively wicked from, or sucked out of, the fibrous web 1 (FIGS. 3 and 14) and 111a (FIGS. 5, 6, and 8).

In some embodiments, at least one analyte can be detected in the fibrous web 1 or 111a, e.g., after exposing the analyte(s) to at least one reagent in the web. Typically, however, at least one analyte passes with the plasma into the downstream medium or media, and the analyte can be detected in or on the downstream medium or media.

For example, with respect to the embodiments illustrated in FIGS. 3 and 14, wherein medium 3 comprises a porous membrane, more preferably a hydrophilic membrane such as a hydrophilic nylon membrane, e.g., a membrane produced in accordance with U.S. Pat. No. 4,340,479, at least one analyte in the essentially cell-free plasma in medium 3 may be analyzed, e.g., after exposure to at least one reagent, which may be present in the medium 3, without interference from the cellular material in the biological fluid sample. Similarly, with respect to an embodiment illustrated in FIG. 14, wherein medium 3 comprises a virus removing or virus capturing membrane as described in for example, copending U.S. patent application Ser. Nos. 08/327,622, and 07/882,473, at least one analyte in the essentially cell-free plasma in medium 3 may be analyzed without interference from the cellular material in the biological fluid sample.

Typically, analysis includes, but is not limited to, colorimetric, spectrophotometric, pH, conductance testing, and/or amplification, to evaluate the presence of the analyte (s).

With respect to the embodiments illustrated in FIGS. 5, 6, and 8, which provide for passing plasma-containing biological fluid from the upstream substantially uniform fibrous web 111a through the porous medium 33 and into the downstream substantially uniform fibrous web 111b, the medium 33 provides for capturing or isolating at least one analyte, particularly, viruses, present in the plasma. In a preferred embodiment, the virus-capturing membrane is a PVDF membrane produced in accordance with U.S. patent application Ser. No. 08/327,622, and the downstream substantially uniform web 111b is produced in accordance with U.S. patent application Ser. No. 08/281,772.

In a more preferred embodiment, wherein the plasma-containing biological fluid placed in contact with the upstream fibrous web 111a (FIGS. 5 and 6) or 111c (FIG. 8) comprises cell-containing biological fluid, e.g., whole blood including an anticoagulant, or fingerstick blood; rather than separated plasma, the upstream fibrous web 111a or 111c is easily physically separated to remove the cell-containing portion of the web from the plasma-containing portion of the web.

Illustratively, using the device 200 of FIG. 6 for reference, a drop of blood is placed in contact with the fibrous web 111a at application zone 250, and the blood diffuses into the web. The plasma front will pass through the web 111a ahead of the red cells. Once the plasma front passes sufficiently through the web, e.g., as the plasma reaches porous medium 33, but before the red cells reach location A, the web 111a is cut at location A to remove the cell-containing section. The separated plasma is allowed to continue to pass, via capillary action, through the upstream web 111a, through the analyte-capturing medium 33, and into downstream web 111b. The analyte(s), e.g., viruses, captured by medium 33 may later be determined, preferably after the analyte has been lysed, and the analyte's nucleic acid amplified.

With respect to the embodiments illustrated in FIGS. 5, 6, and 8, a method for analyzing the analyte preferably further comprises passing at least one wash and/or buffer solution through the device, preferably without using air or liquid pressure to pass the wash and/or buffer solution therethrough. Accordingly, preferably after the plasma has wetted the medium 33, the device 200 is placed in a container suitable for holding buffer solution, as shown in FIG. 7, so that the fibrous web 111a, for example, the plasma-containing portion of the web remaining after cutting at location A to remove the red cells, is facing the bottom of the tube, and the distal end (the end not contacting medium 33) of fibrous web 111b is facing the top of the tube.

In some embodiments (not shown), the distal end of 111b may extend beyond the top of the tube, which may provide for faster evaporation of the wash and/or buffer solution. After the solution(s) have sufficiently wicked or diffused through the device 200, the device is withdrawn from the tube, and medium 33 is separated from the fibrous webs 111a and 111b.

The analyte(s) captured or isolated in or on medium 33 may subsequently be detected. Preferably, when the captured analyte comprises at least one virus, the virus is lysed to release the viral nucleic acid, and at least a portion of the viral nucleic acid is amplified, preferably via a polymerase chain reaction, and detected. The presence of this portion of the viral nucleic acid indicates the presence of the virus. The lysis, amplification, and detection may be carried out as is well known in the art.

In some embodiments, the use of at least one wash and/or buffer solution may provide for removal and/or inactivation of undesirable material before determining the presence of the analyte. For example, after an analyte such as a virus is captured in or on the medium 33, the wash and/or buffer solution may separate and/or inactivate undesirable material such as at least one of a detergent, protein complex, RNase, DNase, or an enzyme inhibitor. Illustratively, since this undesirable material could interfere with the polymerase chain reaction, and thereby lead to inaccurate results, the wash and/or buffer solution can remove or inactivate the interfering material, and the analyte may be amplified and accurately determined. In some embodiments, e.g., wherein it may be desirable to utilize an increased volume of wash and/or buffer solution, the distal end of web 111b may extend beyond the top of the container 500, to allow the solution to evaporate faster. This allows additional fluid to be added to the container 500, and wicked through the device 200.

As noted earlier, certain embodiments of the invention include the use of at least one nonporous medium. For example, structure 2 (FIGS. 1–4 and 14–16), and structures 501–504 (FIGS. 5, 6, and 8) can comprise nonporous media. Typically, at least one nonporous medium is a plastic film or sheet, e.g., Mylar™ and the like. Generally, as will be noted in more detail below, at least one nonporous medium provides support for the device, and/or minimizes evaporation of biological fluid, especially plasma, as it passes through the device.

For example, it may be desirable to include a nonporous medium for support, particularly when the fibrous web and/or the downstream membrane is insufficiently rigid and/or might be damaged while, for example, performing the analyte analysis. In some embodiments, it may be desirable to include a support for ease in carrying out an automated or semi-automated analysis. Also, at least one nonporous medium may provide for ease in manipulating the device, e.g., by allowing the user to hold the device without contacting the wetted or unwetted porous medium.

As illustrated in FIG. 6, the device 200 includes medium 503, such as a nonporous plastic film, e.g., Mylar™, for support. Similarly, structure 2 (in FIGS. 1–4 and 14–16) may provide structural support for the device. In one embodiment, nonporous medium 503 (in FIGS. 6 and 8) includes an adhesive that binds to fibrous webs 111a and 111b, and nonporous medium 504. Similarly, nonporous medium 2 includes an adhesive that binds to fibrous webs 1 and 11 (FIG. 15) or fibrous web 1 (FIG. 16). With respect to FIGS. 6 and 8, in addition to providing structural support for the device, this arrangement, i.e., wherein medium 503 includes an adhesive, allows medium 33 to be easily separated from fibrous webs 111a and 111b as will be noted in more detail below.

Alternatively or additionally, with respect to FIG. 6, the portion of medium 503 extending beyond the first fibrous web 111a, i.e., ahead of the biological fluid application zone 250, allows the device to be manipulated without contacting the porous medium or media of the device. Illustratively, after a drop of blood is placed on the device 200 at application zone 250, the device can be held without placing one's finger in contact the wetted web 111a. In some embodiments, for example, as illustrated in FIG. 6, medium 503 can extend beyond web 111a and 111b so that either or both extensions can be used as a handle. Such an arrangement may be useful when, for example, device 200 is cut at location A, so that the extension of 503 beyond web 111b can be used as a handle.

Similarly, with respect to FIGS. 2, 4, and 16, a portion of structure 2 can extend beyond the web 1 of device 100 for ease in handling. Structure 2 can be extended beyond the web 2 in any direction, and can extend beyond web 2 in more than one direction. If desired, structure 2 in FIG. 3 can be extended beyond medium 3 in one or more directions, to provide a better handle.

In some embodiments, medium 501 (as illustrated in FIGS. 5, 6, 8) and/or structure 2 (as illustrated in FIGS. 15, and 16) which preferably comprise nonporous media such as a plastic film, also provides for minimizing the evaporation of the biological fluid, or portion thereof, e.g., plasma. In some embodiments, this allows more of the biological fluid to be separated and passed through the porous medium 33 (FIGS. 5, 6, and 8) or fibrous web 1 (FIGS. 15 and 16). Even more preferably, medium 501 also includes an adhesive that allows medium 501 to be bound to fibrous webs 111a, 111b, and porous medium 33.

Similarly, structure 2 can include an adhesive to allow that structure be bound to a fibrous web 1 and 11 and/or porous medium 3, as illustrated in, for example, FIG. 15. Among other advantages, in addition to providing reduced evaporation, the use of a nonporous medium with an adhesive may minimize the possibility the porous medium 33 (FIGS. 5, 6, and 8) or fibrous web 11 (FIG. 15) could shift in position, would could reduce the effectiveness of the device. Furthermore, the use of a nonporous medium with an adhesive may allow the porous medium 33 to be more easily separated from the device. In some embodiments, a fibrous resin bond as described earlier can be used to bind at least one medium 501–504 or structure 2 to the device. For example, medium 504 can include a fibrous resin bond between medium 33 and medium 504, wherein the number and diameter of the fibers are adjusted to permit media 33 and 504 to be separated at a desired time.

In the embodiments illustrated in FIGS. 5 and 6, device 200 includes a medium 504, which preferably also comprises a nonporous medium such as a plastic film, and may also provide for minimizing the evaporation of the plasma. With respect to an embodiment of FIG. 6, wherein media 501, 504, and 503 all comprise nonporous media, media 501 and 503 preferably include an adhesive, while medium 504 does not. Accordingly, medium 501 is bound to fibrous webs 111a, 111b, and porous medium 33, and medium 503 is bound to the fibrous webs 111a, 111b, and medium 504. This arrangement allows porous medium 33 to be easily separated from the device 200 at a desired time. For example, before analyzing the analyte(s) captured in or on medium 33, a portion of nonporous medium 501 may be grasped and pulled, thus pulling medium 501 and porous medium 33 away from the fibrous webs 111a and 111b. Typically, after removal, porous medium 33, along with medium 501, is exposed to at least one reagent, so that the captured analyte (s) may eventually be detected.

It should be noted that at least one of media 501 and 504 may extend further along the length of the device 200, to cover a greater portion of the surface of fibrous web 111a and/or 111b, which may further decrease the evaporation of the biological fluid. Structure 2 may be utilized similarly with respect to covering webs 1 and/or 11 in device 100 as illustrated in FIGS. 15 and 16.

However, with respect to device 200, while reducing evaporation from the medium or media upstream of fibrous web 111b (e.g., 111a and porous medium 33) is generally desirable, in some embodiments, reducing evaporation of the plasma from fibrous web 111b itself may be less desirable. For example, as the evaporation from fibrous web 111b may allow more fluid to wash through porous medium 33 and wash the captured analyte, e.g., to remove undesirable material, it may be desirable to allow such evaporation.

As will be noted in more detail below, and as illustrated in FIGS. 6 and 8, an additional medium 502, which may also comprise a nonporous medium such as a plastic film, may also provide for minimizing evaporation upstream of fibrous web 111b. With respect to FIG. 8, additional medium 502 can also maintain fibrous webs 111c and 111a in position, to provide fluid communication between the webs.

In some embodiments, it may be desirable to provide a more defined biological fluid application zone for the device. For example, if it is desirable to increase the likelihood that the biological fluid will be applied to a particular section of the web, a medium 502 such as a nonporous medium, more preferably a plastic film such as Mylar™, may be arranged as shown in FIGS. 6 and 8. This may be particularly desirable for less sophisticated users of the device, who might apply the biological fluid at the wrong end of the device. Additionally, regardless of the sophistication of the user of the device, it may be desirable to cover the non-application zone of the most upstream web of the device, as this may minimize the spread of the sample on the surface of the web. Accordingly, more of the biological fluid enters the interior of the web, allowing more efficient plasma separation.

Of course, it may also be desirable to provide a more defined biological fluid application zone with respect to the embodiments illustrated in FIGS. 1–5, for similar reasons. In some embodiments, e.g., as illustrated in FIG. 6, medium 502 may also provide for minimizing evaporation.

With respect to providing a more defined application zone, in another embodiment, a melt-blown substantially uniform fibrous web is bound to a impermeable structure 2 in a configuration similar to that illustrated in FIG. 2. However, in this alternative embodiment, the portion of structure 2 extending beyond web 1 forms the biological fluid application zone. Illustratively, a drop of blood is placed on the extended portion of structure 2 so as to contact fibrous web 1, and the blood can be wicked laterally through the web.

As noted earlier, some embodiments of the invention include the use of at least one nonporous medium such as a plastic film, e.g., Mylar™ and the like, to provide, for example, support, minimal evaporation, and/or a defined application zone. Alternatively, or additionally, in some embodiments, the nonporous medium can be modified or configured to provide access to a porous medium such as the fibrous web 1 or a membrane, e.g., to allow sampling or detection of the analyte in the porous medium.

Figure 13:
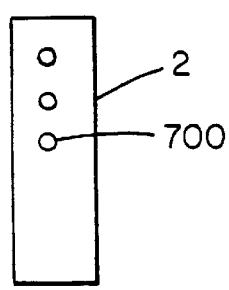
FIG. 13 is a bottom view of a medium configured to provide access therethrough.

Illustratively, with respect to FIGS. 1 and 2, in one embodiment of the invention, wherein structure 2 is a nonporous medium, bound to fibrous web 1, the nonporous medium can be modified, e.g., perforated, before being placed in contact with the web 1, so that at least one analyte passing into the web can be detected. For example, as shown in FIG. 13, wherein structure 2 comprises a nonporous plastic sheet such as Mylar™, the structure can include a row of holes 700. Preferably, holes 700 are located somewhat centrally along the length of structure 2. Typically, the hole diameters will be in the range of from about 0.1 mm to about 1 mm.

Accordingly, once structure 2 including holes 700 has been bound to fibrous web 1, and after the biological fluid has wetted the web, the analyte(s) may be separated, chromatographically, due to for example, differences in size, or in their surface characteristics. The separated or captured analyte of interest, e.g., a virus, bacterium, or nucleic acid, can be sampled through successive holes 700, and identified. In some embodiments, nonporous media can contact both faces of fibrous web 1, and either or both of the nonporous media can include holes 700, for sampling. Of course, at least one nonporous medium, including holes 700, may be used in accordance with other embodiments of the invention. For example, the devices illustrated in FIGS. 3–6, and 8, may include at least one nonporous medium with holes, for sampling or access to a fibrous web and/or membrane.

A variety of other embodiments are encompassed by the present invention. Devices can be configured to provide unidirectional flow, e.g., wherein the biological fluid is applied to one end of the device; or bi- or multi-directional flow, e.g., wherein the biological fluid is applied to a more central portion of the device. For example, with respect to the device 100 illustrated in FIG. 1, the biological fluid application zone 150 can be anywhere along the surface of web 1.

Devices may include a plurality of fibrous webs and/or other media, especially porous media, e.g., membranes. For example, a plurality of melt-blown substantially uniform fibrous webs may be placed in a vertical or horizontal configuration. Different webs may include, for example, different voids volumes, fiber diameters, and/or reagents. Webs may be bound, or unbound. The webs may be bound directly, e.g., with a binding agent between the webs, or bound indirectly, e.g., with a support medium. Illustratively, as shown in FIG. 4, fibrous webs 1 and 11 may be secured together via a binding agent, or, as illustrated in FIG. 8, fibrous webs 111a and 111c may be secured together via at least one nonporous medium. similarly, as illustrated in FIG. 15, fibrous webs 1 and 11 may be secured together via at least one nonporous medium.

Additional fibrous webs and/or other porous media may be included in devices according to the invention. Devices may include one or more webs and one or more porous membranes. Different webs may vary with respect to, for example, at least one of voids volumes, CWST, zeta potential, protein binding characteristics, fiber diameter, basis weight, thickness, and/or reagents. Similarly, in those embodiments including one or more other porous media, e.g., microporous membranes, different porous media may vary with respect, to, for example, voids volumes, CWST, zeta potentials, protein binding characteristics, thickness, porosity, and/or reagents.

Of course, since devices according to the present invention are suitable for a variety of diagnostic applications, the characteristics of a web and/or membrane can differ from one device to another. Illustratively, a device for detecting the presence of Factor VIII can include a web having a CWST of about 74 to about 76 dynes/cm and provide for low protein binding. An alternative device for detecting the presence of glycoproteins (e.g., on red cells) can include a web having a CWST of about 80 to about 90 dynes/cm, have a positive zeta potential, and provide for increased protein binding.

Other embodiments are included within the scope of the invention. For example, in one embodiment, including the use of at least one melt-blown substantially uniform fibrous web in a horizontal configuration similar to that illustrated in FIGS. 5 and 6, the upstream fibrous web and the membrane are as described with respect to those Figures, however, the most downstream porous medium is not the melt-blown substantially uniform fibrous web 111$b$. In this embodiment, the most downstream porous medium is a third porous medium that has a sufficient capillary attraction for the plasma or serum that the fluid is wicked through the membrane into this downstream medium. Illustratively, this downstream porous medium is a melt-blown fibrous web that need not be substantially uniform.

In another embodiment, a device according to the invention includes at least one upstream membrane, and at least one downstream melt-blown non-woven fibrous web. For example, a sample of biological fluid such as blood may be placed in contact with a membrane, and fluid may be wicked through the membrane into the downstream web by capillary action. It may be desirable to cause hemolysis of the red cells in the blood as it passes into the membrane. For example, a membrane having a pore size of about 0.65 $\mu$m may cause the red blood cells to hemolyze and release glycosylated hemoglobin as the fluid passes through the membrane and into the web. The hemoglobin may then be detected.

In other embodiments, e.g., including the use of insoluble particles preplaced in at least one web and/or membrane, devices according to the invention provide a "capture zone" for detecting the presence of at least one analyte. For example, one or more porous media may include one or more preplaced insoluble particles and soluble reagent(s). The preplaced particles can be picked up by the diffusing test fluid together with any soluble reagent(s), which then together with the reacted analyte diffuse into a capture zone at which the mixture can be immobilized by yet another reagent. Alternatively, the mixture can be immobilized by the configuration of the porous medium. For example, the pore structure of the porous medium, e.g., the pore size or the pore diameter, may be large enough to allow unreacted particles to pass through, but small enough to capture or sieve aggregated particles that include the reacted analyte. Regardless of the immobilization protocol, the immobilized mixture can then be detected to determine the presence of the analyte(s).

Illustrative uses

The devices produced in accordance with the invention are compatible with a variety of diagnostic testing protocols, including wet or dry analysis, colorimetric or spectrophotometric analysis, evaluation of pH changes or electrical conductance, e.g., biosensors. They are also compatible with biotechnology related analyte detection protocols, e.g., immunoassays and amplification protocols. The present invention is suitable for both human and veterinary applications.

The present inventive devices can be compatible with automated systems. For example, melt-blown fibrous webs, with or without a nonporous support medium and/or additional porous medium, can be passed through automated systems that dispense one or more reagents to one or more desired regions of the web(s) and/or additional porous media. Illustratively, once a plastic support layer is attached to one or more melt-blown fibrous webs, an automated system can determine the orientation of the device, and pass the web/plastic composite under spray apparatus dispensing the reagents desired. If desired, at least one plastic layer can be applied to another portion, e.g., the top surface of the composite, prior to cutting to width. Of course, the present inventive device can also be compatible with automated analysis systems, e.g., to read the test results after applying biological fluid to the device.

The present invention is suitable for providing a desired amount of processed fluid. For example, in some embodiments, the present invention provides a desired amount of separated plasma. Illustratively, some embodiments of the invention may provide about 3 $\mu$L or more, e.g., about 30 $\mu$L, of separated plasma.

A method according to the instant invention provides for processing a plasma-containing biological fluid, by contacting with such a fluid at least one melt-blown web as described herein. In a preferred embodiment, wherein the plasma-containing biological fluid is also a cell-containing fluid, e.g., blood, the method comprises contacting the web with blood, and separating plasma from the blood. Even more preferably, the separated plasma is essentially cell-free. In some embodiments, at least one analyte of interest (e.g., in the plasma) is detected in the melt-blown substantially uniform fibrous web.

Methods according to the invention may include passing plasma from a melt-blown substantially uniform fibrous web into one or more additional porous media downstream of the web. Illustratively, as noted above, plasma from the uniform fibrous web may be wicked from the fibrous web into the downstream medium or media, and at least one analyte of interest may be detected in or on the downstream medium or media. In a preferred embodiment, the method includes capturing or isolating at least one analyte in or on a microporous membrane downstream of the melt-blown substantially uniform fibrous web.

With respect to analyte detection in the web, and/or in or on the downstream media, methods according to the invention include, but are not limited to, colorimetric, spectrophotometric, pH, and/or conductance testing to evaluate the presence of the analyte(s). The presence of the analyte(s) may be detected by the level of radioactivity present. Additionally, as will be noted in more detail below, the method may include capturing and/or isolating at least one analyte, and then amplifying and detecting at least a portion or a component of the analyte to indicate the presence of the analyte(s). Typically, those embodiments of the method comprising amplification of a portion of the analyte include lysing at least one captured analyte such as a virus to release the viral nucleic acid, i.e., DNA or RNA, and then amplifying at least a portion of the nucleic acid. Preferably, amplification includes utilizing a polymerase chain reaction to amplify a portion of the nucleic acid.

The following examples further illustrate the present invention and, of course, should not be construed as in any way limiting its scope.

EXAMPLES

In the following examples 1–6, the fibrous webs are treated with oxygen plasma, as generally described with respect to U.S. Pat. No. 5,258,127.

The fibers are modified by exposure to oxygen plasma generated by a 2 kilowatt 40 kilohertz power input in a 0.5 cubic meter chamber for about 5 to about 15 minutes at a temperature of about 50° C. to about 80° C. at a gas pressure of about 135 mtorr. The fibers are modified whereby the surface of the web is modified from its natural hydrophobic state, causing it to become hydrophilic, such that a drop of water placed on its surface is rapidly absorbed into its pores. After modification, the web has a CWST of about 110 dynes/cm.

Example 1

A device is constructed having a configuration corresponding generally to that illustrated in FIG. 6. The upstream and downstream sections of melt-blown fibrous webs (111a and 111b, respectively) are produced in accordance with U.S. patent application Ser. No. 08/281,772. The webs, which each comprise polybutylene terephthalate (PBT) fibers having an average diameter of about 1.1 μm, each have a voids volume of about 78%. The webs are about 7.2 mils (0.018 cm) thick. Each web has a basis weight of about 5 g/ft². After oxygen plasma treatment the webs have a CWST of about 110 dynes/cm. The webs are trimmed, so that web 11a is about 20 mm long, and web 11b is about 30 mm long, with the length of strip parallel to the fiber orientation.

A polyvinylidene fluoride (PVDF) membrane (33) having a $K_{UF}$ of about 17 psi is produced in accordance with Ser. No. 08/327,622, and interposed between the ends of the fibrous webs, as is discussed below. The membrane is trimmed to provide a portion about 5 mm long.

Nonporous Mylar™ films, commercially available from Adhesive Research Inc. (Glen Rock, Pa.), as Arcare™, under the part numbers as listed below, are used to provide media 501–504. Mylar™ strips 501 and 504 (part no. 78-15), which include diagnostic grade adhesive grade AS 110 on one side, are about 2 mils thick, and about 10 mm long. Mylar™ strip 503 (part no. 78-43), which also includes diagnostic grade adhesive grade AS 110 on one side, is about 3 mils thick, and about 55 mm long. Mylar™ strip 502 (part no. 77-59) is about 1 mil thick, and includes AS 110 grade adhesive. Mylar™ strip 502 is about 14 mm long.

The membrane is interposed between the fibrous webs in the following manner. Mylar™ strip 501 is placed so that the adhesive layer contacts and overlaps fibrous web 111b, binding it thereto, with a portion of Mylar™ strip 501 extending beyond the end of the web. The membrane 33 is placed in contact with the adhesive layer of Mylar™ strip 501 and fibrous web 111b, so that about 2.5 mm of the membrane contacts and overlaps the end of web 111b.

Fibrous web 111a is placed in contact with the adhesive layer of 501, and membrane 33, so that about 2.5 mm of the membrane contacts and overlaps the end of web 111a. The membrane 33 is bound to strip 501 via the adhesive layer of 501, and the fibrous webs 111a and 111b are bound to strip 501 via the adhesive layer of 501. Membrane 33 is in physical contact with webs 111a and 111b, but there is no adhesive between membrane 33 and the webs. There is a distance of about 2 mm between the membrane facing ends of the fibrous webs 111a and 111b.

Mylar™ strip 504 is then placed over the ends of webs 111a and 111b, and the interposed membrane 33. The adhesive layer of 504 faces downward, so that it may be placed in contact with the adhesive layer of 503. The adhesive layer of 503 is also placed in contact with the webs 111a and 111b. Mylar™ strip 502 is placed on the first fibrous web 111a as shown in FIG. 6 to define a blood drop application zone of about 3 mm and to minimize evaporation and surface wetting.

Once all the media are assembled, the device is trimmed to provide a width of about 5 mm.

A drop of blood is placed on the first fibrous web in the blood application zone, and the fluid rapidly enters the web. Within a short time, the upstream web is completely wetted, with the clear plasma front reaching the membrane, and the red blood cell front lagging behind. Once the plasma reaches the membrane, the red blood cell containing portion of the upstream web is cut off. The remaining portion of the upstream web shows no red color.

As shown in FIG. 7, the device is placed in a plastic test tube 500, of which the inside diameter is approximately 7 mm, and the depth is 90 mm. The tube contains about 40 μL of a buffer solution, physiologically buffered saline (PBS). The device is placed in the tube with the cut portion of the web facing down, contacting the bottom of the test tube and the buffer solution. The plasma and buffer solution wicks through the fibrous web 111a, membrane 33, and into web 111b. After approximately 4 hours, the device is removed from the tube. The PVDF membrane 33 is removed from the fibrous webs 111a and 111b by bending the ends of the device, grasping an end of Mylar™ strip 501 with a forceps, and pulling the strip 501. The strip 501 debonds readily from the fibrous webs 111a and 111b, but not membrane 33. Since the adhesive side of strip 501 contacts membrane 33, and the adhesive side of strip 504 does not, strip 501 is pulled away from the device along with membrane 33.

Example 2

A device is constructed having a configuration corresponding generally to that illustrated in FIG. 8. This device is constructed in a manner similar to that described in Example 1. Webs 111a and 111b are as generally described in Example 1, however, fibrous web 111a is about 15 mm long, which is about 5 mm shorter than that used in Example 1. The webs, which each comprise polybutylene terephthalate (PBT) fibers having an average diameter of about 1.1 μm, each have a voids volume of about 78%. The webs are about 7.2 mils (0.018 cm) thick. Each web has a basis weight of about 5 g/ft². After oxygen plasma treatment the webs have a CWST of about 110 dynes/cm.

Fibrous web 111c is produced in accordance with U.S. patent application Ser. No. 08/281,772. The web, which comprises polybutylene terephthalate (PBT) fibers having an average diameter of about 1.2 μm, has a voids volume of about 80%. The web is about 11 mils thick, and the basis weight is about 5 g/ft². The web has a CWST of about 110 dynes/cm. The web is trimmed, so that the length is about 8 mm The PVDF membrane, and the Mylar™ strips, are as described with respect to Example 1. However, Mylar™ strip 503 is about 60 mm long, so as to also allow contact with fibrous web 111c. The media are placed in contact with each other as generally described in Example 1, However, web 111c is placed in contact with web 111a and Mylar™ strip 502 before Mylar™ strip 503 is placed on top of the overlapping ends of webs 111c and 111a. Strip 503 adheres to webs 111a, 111b, and 111c. Webs 111c and 111a are in physical contact without a bond between them.

A drop of fingerstick blood is placed on the first fibrous web 111c in the blood application zone, and the fluid rapidly enters the web. The clear plasma front passes ahead of the red cells, through web 111c and 111a, and contacts PVDF membrane 33. Once the plasma reaches the membrane, the red blood cell containing portion of web 111a is cut off, so that web 111c and a portion of web 111a are separated from the device.

The device is contacted with buffer solution, and the membrane removed as described with respect to Example 1.

Example 3

A device is constructed having a configuration generally corresponding to that shown in FIG. 3.

The melt-blown fibrous web 1 is produced in accordance with U.S. patent application Ser. No. 08/281,772, using two fiberizers. One fiberizer is used to produce the web, and the other fiberizer deposits binding resin fibers on the produced web. The web, which comprises polybutylene terephthalate (PBT) fibers having an average diameter of about 1.2 $\mu$m, has a voids volume of about 80%.

Polyethylene is fiberized with the resin delivery and scanning rates adjusted to deposit about 2 g/m² of bonding fiber of about 7 $\mu$m in diameter. The bonding fibers are impinged on the surface of the web, covering about 2 to about 5% of the surface of the web.

The web is treated with oxygen plasma, as generally described with respect to U.S. Pat. No. 5,258,127, to produce a web having a CWST of about 110 dynes/cm.

A portion of the web is compressed, so that the voids volume is about 59% in the thinner section or portion 10, while the voids volume remains about 80% in the thicker section. The web is trimmed so that the thicker section is about 0.5 cm long, and the thinner section or portion 10 is about 0.2 cm long.

The web 1 is placed in contact with a nylon hydrophilic membrane 3 having a pore size of about 0.5 $\mu$m, and a thickness of about 0.02". The polyethylene coated surface 44 of the web faces the upper surface 54 of the membrane. The membrane is of sufficient size to cover the lower surface of the web, and to provide a cantilevered section 5 extending at least about 1.0 cm beyond the width of the compressed portion 10 of the web.

The web 1 and the membrane 3 are gently compressed to ensure uniform and intimate contact, with heat of about 130° C. applied to the lower surface of the membrane for less than about 10 seconds, to bind the web to the membrane.

A strip of commercially available nonporous Mylar™ film 2, including diagnostic grade adhesive grade on one side, is about 0.005" thick, and of sufficient length to cover the lower surface of membrane 3. The lower surface of membrane 3 is placed in contact with the adhesive surface of Mylar™ film 2.

The resultant device is trimmed to provide a width of about 0.5 cm , wherein the cantilevered section 5 extends about 1.5 cm beyond the compressed portion 10.

A drop of about 15 $\mu$L of fingerstick blood is placed in contact with the web 1 at application zone 150. Plasma from the applied blood sample passes into the membrane 3 and diffuses to fill the whole membrane while red and white blood cells are retained. The plasma in the cantilevered portion of the membrane is then evaluated.

Example 4

A series of devices were constructed, each having a configuration generally corresponding to that shown in FIG. 16, including a melt blown fibrous web 1 and a nonporous Mylar™ film 2. The film 2 included an adhesive so that it can be bound to web 1.

The melt-blown fibrous web 1 was produced as described in copending U.S. patent application Ser. No. 08/281,772.

The web comprises polybutylene terephthalate fibers, hereinafter referred to as PBT. The web was prepared with the following operating conditions: Air temperature was 311° C., and air pressure was 2.25 Kg/cm² through air orifice diameters of 0.107 cm , and the two sets of intersecting fiber streams delivered PBT resin at 305° C. and at the rate of 0.59 grams per minute per nozzle. The fiber streams impinged at a distance of 3.0 cm (i.e., DCD=3.0 cm ) on a 17.3 cm diameter by 152 cm long collection cylinder which was rotated at 500 rpm while it was simultaneously translated axially at the rate of 0.2 cm per revolution for the single length of a 127.4 cm stroke, thereby depositing on the surface of the collecting cylinder in 1.4 minutes 0.0054 grams per cm² of fibrous web, which was then cut to 106 cm long, slit lengthwise, and removed from the cylinder, forming a sheet 54 cm wide×106 cm long. The product characteristics were: thickness 0.0183 cm , average fiber diameter 1.3 $\mu$m , and the voids volume was 78.1%.

The fibers were modified by about 7 minutes of exposure to oxygen plasma to produce a web having a CWST of about 110 dynes/cm.

A portion of the 54×106 cm sheet was attached to a nonporous Mylar™ film, commercially available from Adhesive Research Inc. (Glen Rock, Pa), as Arcare™, under the part number 78-15. The film included diagnostic grade adhesive grade AS 110 on one side, and was about 2 mils thick. Another sheet of this nonporous Mylar™ film was attached to the other surface of the web. However, as shown in FIG. 16, the sheet on one surface of the web was shorter than the other, to provide an application zone 150. The shorter sheet of nonporous film was trimmed before attachment to the web, and provided an application zone of about 3 mm.

A series of test specimens were cut from this composite to 0.5 cm×6.0 cm, their length being in the cross machine direction (CMD), i.e., the length of the 5×60 mm strip is perpendicular to the length of the 54×106 cm rectangular sheet from which it was cut.

Samples of 20 $\mu$L of freshly drawn blood with anticoagulant were measured by pipette and then placed about 0.1 to 0.2 cm from the end of the 0.5×6.0 cm strips. The blood was then observed to spread along the length of the web, and clear plasma appeared ahead of the red cells within about 10 seconds. The plasma front continued to advance, until wicking stopped. The time to completion, i.e., the time from when the sample first contacted the strip, to the time that the sample was fully imbibed and flow stopped, was determined. The length of the strip wetted by the plasma, and the length of the strip wetted by the red blood cells was measured, and the efficiency of plasma collection or recovery was then calculated as described earlier as method #3. The plasma collection efficiency was determined as shown in Table I.

TABLE 1

| Hematocrit, | Length of Section, mm | | Plasma Recovery, | Time to Completion, |
|---|---|---|---|---|
| % | Red Cell | Plasma | % | Seconds |
| 32.5 | 23.7 | 14.6 | 38 | 556 |
| 34.0 | 23.0 | 14.5 | 39 | 460 |
| 38.0 | 24.7 | 12.2 | 33 | 579 |
| 38.0 | 24.0 | 10.5 | 30 | 728 |
| 38.6 | 23.1 | 13.9 | 38 | 745 |
| 42.0 | 24.5 | 12.1 | 33 | 820 |

As shown in Table I, device according to the invention provide efficient plasma recovery for blood having a range of hematocrits.

Example 5.

A series of devices were constructed, having a configuration generally corresponding either to that shown in FIG. 15, including melt-blown fibrous webs 1 and 11, and non-porous plastic films 2, or FIG. 16, including melt-blown fibrous web 1, and nonporous films 2. The descriptions of the configurations of the webs 1 and 11 are summarized in Table II wherein medium 1 refers to web 1, and medium 11 refers to web 11.

TABLE II

Description of Device Media Configuration

| Device Example # | Reference Figure # | Media 1 Type | Media 1 Length | Media 11 Type | Media 11 Length |
|---|---|---|---|---|---|
| $5_E$ | 16 | $5_A$ | 40 mm | not used | not used |
| $5_F$ | 16 | $5_B$ | 40 mm | not used | not used |
| $5_G$ | 15 | $5_D$ | 05 mm | $5_B$ | 35 mm |
| $5_H$ | 15 | $5_D$ | 10 mm | $5_B$ | 30 mm |
| $5_I$ | 15 | $5_C$ | 05 mm | $5_B$ | 35 mm |
| $5_J$ | 15 | $5_C$ | 10 mm | $5_B$ | 30 mm |

The films each included an adhesive, so that the films could be bound to the webs 1 and 11 (FIG. 15 configuration) or web 1 (FIG. 16 configuration). The device corresponding generally to the configuration shown FIG. 15, differed from that shown in the FIG. in that the film 2 used to define the blood application zone 150 extended to cover the remainder of the top surface of web 11.

The melt-blown fibrous webs 1 and 11 were produced in accordance with U.S. patent application Ser. No. 08/281,772, using PBT fibers. The description of the media configuration is summarized in Table II, and the fiberizing conditions are summarized in Table III. The webs were treated with oxygen plasma, to produce webs having a CWST of about 110 dynes/cm.

The devices having a configuration corresponding to that shown in FIG. 15 were constructed as follows:

The webs were cut into sections about 75 mm×about 40 mm. The plastic films were cut to a size of about 75 mm×about 5 mm for Examples 5G and 5I, and about 75 mm×about 10 mm for Examples 5H and 5J. The adhesive protective layer, or parting layer, was removed, and the long side of the film was overlapped onto one surface of the web 11 by about 2–3 mm and brought into contact with the web, so that the adhesive contacted the web. The other web, web 1, was then brought in contact with both the web 1 and the film 2, so that about 2–3 mm of the webs 1 and 11 overlapped, and at least about 2–3 mm of the adhesive layer of the film 2 contacted a surface of web 1. There was no adhesive between webs 1 and 11, but each web was adhered to film 2. The surface of web 1 that was not covered by film 2 was the sample application zone 150.

Another plastic film 2 was cut of sufficient size to cover the entire other surface of webs 1 and 11, as illustrated in FIG. 16. The plastic film 2 was of sufficient size to end beyond the end of web 1, to provide a handle for the device, as illustrated in FIG. 16. The adhesive protective layer of this second film 2 was cut and partially removed so that the adhesive was placed in contact with fibrous webs 1 and 11. A portion of the adhesive layer cover remained adhered to the film to provide an easy to use handle. This remaining layer covered the top portion of film 2 that extended beyond web 1.

A portion of the 54×106 cm sheet was attached to a nonporous Mylar™ film, commercially available from Adhesive Research Inc. (Glen Rock, Pa.), as Arcare™, under the part number 78-15. The film included diagnostic grade adhesive grade AS 110 on one side, and was about 2 mils thick. Another sheet of this nonporous Mylar™ film was attached to the other surface of the web. However, the sheet on one surface of the web was shorter than the other, to provide an application zone 150. The shorter sheet of

TABLE III

Fiberizing Conditions

| Example # | Air Temp. °C. | Resin Temp. °C. | Air Pressure Kg/cm² | DCD cm | Cylinder RPM | g Resin Per Min. Per Nozzle |
|---|---|---|---|---|---|---|
| $5_A$ | 317 | 309 | 2.46 | 3.0 | 500 | 0.69 |
| $5_B$ | 317 | 309 | 2.46 | 3.0 | 500 | 1.08 |
| $5_C$ | 317 | 309 | 2.46 | 3.0 | 500 | 0.69 |
| $5_D$ | 317 | 309 | 2.46 | 3.0 | 500 | 1.08 |

| Device Example # | Translation Rate cm/rev | No. Pass | Stroke cm | Stroke Time | WEB gm/cm² | WEB Thickness cm | Fiber DIA μm | Voids Vol. % |
|---|---|---|---|---|---|---|---|---|
| $5_A$ | 0.254 | 1 | 127.4 | 1.00 | .0043 | .0152 | 1.1 | 79 |
| $5_B$ | 0.203 | 1 | 127.4 | 1.25 | .0054 | .0185 | 1.1 | 78 |
| $5_C$ | 0.254 | 2 | 127.4 | 2.00 | .0086 | .0305 | 1.i | 79 |
| $5_D$ | 0.203 | 2 | 127.4 | 2.51 | .0108 | .0371 | 1.1 | 78 |

The devices having a configuration corresponding to that shown in FIG. 16 were constructed in the manner generally described in Example 4. The web 11 was 40 mm in length, as indicated in Table III. As noted above, Table III includes the description of the media utilized for those devices having the general configuration shown in FIG. 15.

nonporous film was trimmed before attachment to the web, and provided an application zone of about 3 mm.

A series of test specimens were cut from this composite 0.5 cm×6.0 cm , their length being in the cross machine direction (CMD), i.e., the length of the 5×60 mm strip is perpendicular to the length of the 54×106 cm rectangular sheet from which it was cut.

All of the devices were tested in the following manner:Samples of 20 μL of freshly drawn blood with anticoagulant were measured by pipette and then placed about at application zone 150, e.g., 0.1 to 0.2 cm from the end of the webs 1.

With respect to the devices configured in accordance with FIG. 15, the blood was then observed to spread along the length of the web 1 and into web 11, and clear plasma appeared ahead of the red cells within about 10 seconds.

With respect to the devices configured in accordance with FIG. 16, the blood was then observed to spread along the length of the web 1, and clear plasma appeared ahead of the red cells within about 10 seconds.

For all of the tests, the plasma front continued to advance, until wicking stopped. The time to completion, i.e., the time from when the sample first contacted the strip, to the time that the sample was fully imbibed and flow stopped, was determined. The length of the strip wetted by the plasma, and the length of the strip wetted by the red blood cells was measured, and the efficiency of plasma collection or recovery was then calculated as described earlier as method #3. The plasma collection efficiency was determined as shown in Table IV.

TABLE IV

| Device Example # | Hematocrit, % | Length of Section, mm | | Plasma Recovery, % | Time to Completion, Seconds |
| --- | --- | --- | --- | --- | --- |
| | | Red Cell | Plasma | | |
| 5$_E$ | 40 | 22.2 | 10.6 | 32 | 547 |
| 5$_F$ | 40 | 21.0 | 11.0 | 34 | 489 |
| 5$_G$ | 40 | 17.4 | 17.0 | 49 | 266 |
| 5$_H$ | 40 | 14.6 | 16.1 | 52 | 143 |
| 5$_I$ | 40 | 18.6 | 15.4 | 45 | 355 |
| 5$_J$ | 40 | 17.7 | 15.0 | 46 | 296 |

As shown in Table IV, the plasma separation efficiency for devices including different types of fibrous media (FIG. 15 configuration) is greater than for those devices including a single type of fibrous medium (FIG. 16 configuration).

For example, the device configured as Example 5H, containing as Medium 1 10 mm of a medium described in Example 5D and as Medium 11 30 mm of a medium described in Example 5B, yielded higher plasma recovery (over 50%) and a faster time to completion than a device configured as 5F (which contains a single type of fibrous medium, that which was described in Example 5B).

The data further described the effect of shorter distances of decrease in thickness of the Medium 1 of FIG. 15. Shortening the distance had a small effect on plasma recovery (compare (Example 5H to Example 5G) and (Example 5J to Example 5I)) but had a larger effect on time to completion (again compare (Example 5H to Example 5G) and (Example 5J to Example 5I). Decreasing the thickness of Medium 1 had a pronounced effect on time to completion. For instance, when the Medium 1 thickness went from 0.0371 (as in Example 5H) to 0.0305 (as in Example 5J), the time required to imbibe and wick the drop of blood doubled (from 143 sec. to 296 sec.).

Example 6

A series of devices generally corresponding to the configuration to that shown in FIG. 15 are constructed as described in Example 5.

The devices are used for a blood glucose test. Glucose oxidase and an organic redox dye are added to fibrous web 11 at preselected locations, so that the clear plasma passing into the web 11 contacts both the glucose oxidase enzyme system and the organic redox dye. The blood glucose contacts the glucose oxidase, and through a series of enzyme directed reactions, the dye is chemically modified to cause a color change. The color change is compared to a reference standard, and the blood glucose level is determined.

The following examples illustrates the preparation of viral capturing or viral separation membranes (33) that can be used in accordance with the present invention.

Example 7

This example illustrates the preparation of several viral capturing or viral filtration membranes that can be used in accordance with the present invention. The various membranes were prepared using different casting solution temperatures to demonstrate the effect of the casting solution temperature on the $K_{UF}$ of the resulting membrane.

A casting solution was prepared from 17.0 wt. % polyvinylidene fluoride resin, 66.4 wt. % dimethyl acetamide (solvent), and 16.6 wt. % isopropanol (non-solvent). The casting solution was stirred in an enclosed vessel to dissolve the polyvinylidene fluoride resin in the 80:20 w/w solvent/nonsolvent mixture, and the temperature of the casting solution was raised to 50.9° C. and held at that temperature.

Four casting solution samples were then passed through an in-line mixer, and each of the casting solution samples was raised to a different temperature. Each of the solutions was then cooled to increase viscosity, cast as a film onto a substrate, and subjected to a quench bath comprising 42 wt. % water, 51 wt. % dimethyl acetamide, and 7 wt. % isopropanol. The quench bath was maintained at 30° C. The cast film generally remained in contact with the quench bath for less than one minute. The resulting membrane was then washed with water to remove solvent, and the membrane was microwave dried under restraint to prevent shrinkage. Membranes were thus prepared with each of the four casting solution samples.

The temperatures of each of the casting solution samples and the $K_{UF}$ values of each of the resulting membranes are set forth below.

| Sample | Temperature (°C. ± 0.01 °C.) | $K_{UF}$ (psi) [kPa] |
| --- | --- | --- |
| 1A | 58.22 | 30 [207] |
| 1B | 58.97 | 23 [159] |
| 1C | 59.77 | 18 [124] |
| 1D | 60.17 | 17 [117] |

As is apparent from the data, an increase in the casting solution temperature within the range of about 57° C. to about 60° C. results in a corresponding decrease in the $K_{UF}$ of the membrane prepared from the casting solution.

Example 8

This example illustrates the preparation of viral capturing or viral filtration polyvinylidene fluoride membranes which have been provided with a graft-polymerized coating so as to render the membrane hydrophilic and less susceptible to protein binding. The properties of such membranes both before and after grafting were evaluated to demonstrate that the grafting process does not adversely affect the pore rating of the membrane and contributes to only a modest increase in pressure drop across the membrane.

Several membranes of differing $K_{UF}$ values were prepared in accordance with the procedure described in Example 7. A portion of each membrane was grafted using an electron-beam grafting procedure. In particular, the membranes were passed under an electron-beam generator (with 175 kV and 3 mAmp settings) at a rate of 20 ft/min so as to achieve a total radiation dose of 2.4 Mrad. The membranes were then passed into a grafting solution of 4 vol. % hydroxypropylacrylate, 25 vol. % t-butyl alcohol, and 71 vol. % deionized water, rolled up under a nitrogen atmosphere (i.e., protected from oxygen), and stored for several hours prior to washing free of ungrafted monomer. The grafted membranes were frame-dried at 100° C. for 10 min.

The $K_{UF}$, thickness, and pressure drop ($\Delta P$) across each membrane, in ungrafted and grafted form, were determined, and the results are set forth below.

| Sample | Ungrafted Membrane | | | Grafted Membrane | | |
|---|---|---|---|---|---|---|
| | Thickness (mil ± 0.2 mil) [µm ± 5 µm] | $K_{UF}$ (psi) [kPa] | $\Delta P$ (in. Hg) [cm Hg] | $K_{UF}$ (psi) [kPa] | $\Delta P$ (in. Hg) [cm Hg] | water wettable |
| 2A | 1.6 [41] | 17 [117] | 5.5 [14.0] | 18 [124] | 5.7 [14.5] | yes |
| 2B | 1.6 [41] | 24 [165] | 10.2 [25.9] | 25 [172] | 13.8 [35.1] | yes |
| 2C | 1.9 [48] | 21 [145] | 16.7 [42.4] | 24 [165] | 28.7 [72.9] | yes |
| 2D | 2.0 [51] | 24 [165] | 16.6 [42.2] | 25 [172] | 28.7 [72.9] | yes |
| 2E | 1.9 [48] | 17 [117] | 8.0 [20.3] | 16 [110] | 6.8 [17.3] | yes |

As is apparent from the resulting data, the grafting of the membranes renders those membranes desirably hydrophilic, i.e., water wettable, while adversely affecting the $K_{UF}$ and pressure drop characteristics of the membrane in only a modest manner.

Example 9

This example illustrates the excellent titer reductions against various viruses which are characteristic of the viral capturing membrane.

Various membranes (142 mm discs of about 1.5–2.0 mil (38–50 µm) thickness) were prepared in accordance with the procedure disclosed in Example 7 and were grafted in accordance with the procedure disclosed in Example 8. The grafted membranes were challenged with a 50:50 mixture of $T_1$ and PP7 bacteriophages (at a level of about $10^{10}$ bacteriophages/ml) in a gel phosphate buffer. As previously discussed, the size of the $T_1$ phage is about 0.078 µm, while the size of the PP7 phage is about 0.027 µm. Thus, these bacteriophages are quite representative of larger and smaller viruses, respectively. The titer reductions of each membrane, alone or multiple-layered, was determined as the ratio of the particular phage contained in the influent to that present in the effluent. The $K_{UF}$ of the ungrafted membrane, the number of membrane layers tested, and the titer reduction ($T_R$) for each phage are set forth below.

| Sample | $K_{UF}$ (psi) [kPa] | Number of Layers | $T_R$ ($T_1$ phage) | $T_R$ (PP7 phage) |
|---|---|---|---|---|
| 3A | 23 [159] | 3 | >1.3 × 10¹⁰ | >4.4 × 10⁹ |
| 3B | 21 [145] | 3 | >1.3 × 10¹⁰ | 8.0 × 10⁶ |
| 3C | 24 [165] | 1 | >9.1 × 10⁹ | 5.0 × 10¹ |
| 3D | 24 [165] | 2 | >9.1 × 10⁹ | 4.0 × 10² |
| 3E | 24 [165] | 3 | >1.0 × 10⁹ | 5.0 × 10⁴ |
| 3F | 24 [165] | 3 | >1.0 × 10¹⁰ | 1.0 × 10⁵ |
| 3G | 23 [159] | 3 | >1.0 × 10¹⁰ | 9.0 × 10⁵ |
| 3H | 17 [117] | 3 | >1.0 × 10¹⁰ | 5.7 |

The resulting data demonstrates that the membrane can have a very high titer reduction and can be capable of the "absolute" removal of viruses, as is particularly apparent with sample 3A. Moreover, this high titer reduction capability can be accomplished with remarkably thin membranes, as exemplified by sample 3C. In addition, the resulting data demonstrates that the membrane has a very uniform pore structure. For example, sample 3H, is capable of removing all of the $T_1$ bacteriophage while allowing essentially all of the PP7 bacteriophage to pass through. Thus, the sample 3H membrane has a pore size between about 0.078 µm and about 0.027 µm, which is quite a narrow pore size distribution.

Example 10

This example further illustrates the excellent virus titer reduction which is characteristic of the viral capturing membrane.

The grafted membrane of Example 9 which was designated sample 3F was challenged with a mixture of PR772 coliphage (at a level of 5.2×10⁸ phages/ml) and PP7 bacteriophage (at a level of 1.7×10⁹ phages/ml) in a gel phosphate buffer. As previously described, the size of the PR772 phage is about 0.053 µm, while the size of the PP7 phage is about 0.027 µm. Thus, these phages are quite representative of intermediate-sized and smaller viruses, respectively. The titer reductions of each membrane, alone or multiple-layered, was determined as the ratio of the particular phage contained in the influent to that present in the effluent. The $K_{UF}$ of the ungrafted membrane, the number of membrane layers tested, and the titer reduction ($T_R$) for each phage are set forth below.

| Sample | $K_{UF}$ (psi) [kPa] | Number of Layers | $T_R$ (TPR772 phage) | $T_R$ (PP7 phage) |
|---|---|---|---|---|
| 3G | 23 [159] | 3 | >5.2 × 10$^8$ | 2.2 × 10$^6$ |

The determined results confirm the excellent titer reduction of the membrane against intermediate-sized viruses. Moreover, in view of the moderate removal effectiveness of this particular membrane sample against the much smaller PP7 phage, the pore size of this particular membrane sample is shown to be quite small, i.e., below about 0.053 μm, while the pore size distribution of the sample is also shown to be quite narrow, i.e., from somewhat below about 0.027 μm to below about 0.053 μm.

Example 11

This example illustrates the approximate lower operating limit in terms of pore size of the viral capturing membrane as regards a satisfactory titer reduction against larger viruses.

A membrane of 1.8 mil (46 μm) thickness was prepared in accordance with the procedure described in Example 7 and evaluated as regards $K_{UF}$, pressure drop (ΔP), and titer reduction ($T_R$) against $T_1$ and PP7 bacteriophages as described in Example 9. The resulting data is set forth below.

| Sample | KUF (psi) [kPa] | Δp (in. Hg) [cm Hg] | Number of Layers | $T_R$ ($T_1$ phage) | $T_R$ (PP7 phage) |
|---|---|---|---|---|---|
| 5A | 17 [117] | 6.8 [17.3] | 1 | 7 × 10$^6$ | <10 |
| 5B | 17 [117] | 6.8 [17.3] | 2 | >9 × 10$^8$ | <10 |

The resulting data demonstrate that the membrane having a $K_{UF}$ value of about 17 psi (117 kPa) and a thickness of at least about 3.6 mil (92 μm) will exhibit a titer reduction of over 10$^8$ against larger viruses. The fact that the membrane of this example had an "absolute" removal ability with respect to the larger $T_1$ phage while having essentially no removal ability with respect to the smaller PP7 phage demonstrates that the medium not only has a pore size of between about 0.078 μm and about 0.027 μm, but that the pore size distribution is quite narrow, i.e., below about 0.078 μm to above about 0.027 μm.

Example 12

This example illustrates the low protein adsorption characteristics of the grafted viral capturing membrane.

An immersion load binding test was performed on samples of grafted filtration membranes prepared in accordance with the procedure of Example 8 (samples 6A–6D), as well as on ungrafted controls (samples 6E and 6F). Each membrane was immersed in IgG solution containing $^{125}$I goat IgG and 200 μg/ml unlabeled goat IgG for 60 minutes. Each membrane was washed with phosphate buffered saline (PBS) and evaluated for adsorbed IgG. The membranes were then washed with an aqueous solution of 1% SDS in 2M urea and evaluated again for adsorbed IgG. The results of these evaluations are set forth below.

| Sample | Substrate | Grafting Solution | Thickness (mil) [μm] | Post-PBS Adsorption (μg/cm$^2$) | Post-SDS Adsorption (μg/cm$^2$) |
|---|---|---|---|---|---|
| 6A | PVDF | 12% HEMA | 1.9 [48] | 25.9 | 19.5 |
| 6B | PVDF | 9% HEMA | 1.8 [46] | 28.8 | 23.9 |
| 6C | PVDF | 9% HEMA | 1.7 [43] | 22.4 | 19.6 |
| 6D | PVDF | 4% HPA | 1.7 [43] | 12.4 | 8.8 |
| 6E | PVDF | none | 1.6 [41] | — | 86.6 |
| 6F | PVDF | none | 1.5 [38] | — | 82.6 |

The resulting data demonstrates that a membrane which has been suitably graft polymerized will have a low protein adsorption level. The membranes grafted with hydroxyethylmethacrylate (HEMA) exhibited a much reduced level of protein adsorption as compared to the ungrafted controls. Moreover, the membrane grafted with hydroxypropylacrylate (HPA) adsorbed only about half as much protein as the HEMA-grafted membranes.

Example 13

This example illustrates that the microwave drying of the viral capturing membrane has no significant adverse effect on the filtration characteristics of the membrane.

Two membrane samples were prepared in accordance with the procedure described in Example 7. One of the membranes was dried with a microwave dryer (designated 7A), while the other of the membranes was dried with a steam drum-dryer (designated 7B). The $K_{UF}$ values of the two membranes were determined both before and after drying, and the results are set forth below.

| Sample | $K_{UF}$ (as cast) (psi) [kPa] | $K_{UF}$ (dried) (psi) [kPa] |
|---|---|---|
| 7A | 22 [152] | 21 [145] |
| 7B | 22 [152] | 17 [117] |

These results demonstrate that microwave drying of the membranes, in contrast to conventional drying, does not substantially affect the pore size of the membrane.

Example 14

This example illustrates the isotropic nature, i.e., symmetrical pore structure, of the viral capturing membrane.

Several membranes of differing $K_{UF}$ values were prepared in accordance with the procedure described in Example 7. The $K_{UF}$ and pressure drop (ΔP) divided by thickness (in. Hg/mil and cm Hg/μm) for each membrane were determined, and the results are set forth below.

| Sample | K$_{UF}$ (psi) [kPa] | ΔP/mil(in. Hg/mil) [cm Hg/μm] |
|---|---|---|
| 8A | 12 [83] | 1.50 [0.15] |
| 8B | 12 [83] | 1.32 [0.13] |
| 8C | 13 [90] | 1.50 [0.15] |
| 8D | 16 [110] | 3.27 [0.33] |
| 8E | 17 [117] | 2.84 [0.28] |
| 8F | 17 [117] | 2.93 [0.29] |
| 8G | 17 [117] | 2.63 [0.26] |
| 8H | 17 [117] | 4.27 [0.43] |
| 8I | 18 [124] | 2.65 [0.27] |
| 8J | 18 [124] | 4.06 [0.41] |
| 8K | 19 [131] | 3.90 [0.39] |
| 8L | 21 [145] | 11.20 [1.12] |
| 8M | 21 [145] | 5.33 [0.53] |
| 8N | 22 [152] | 20.75 [2.08] |
| 8O | 22 [152] | 7.85 [0.79] |
| 8P | 23 [159] | 8.00 [0.80] |
| 8Q | 23 [159] | 14.40 [1.44] |
| 8R | 23 [159] | 11.00 [1.10] |
| 8S | 24 [165] | 12.08 [1.21] |
| 8T | 24 [165] | 14.96 [1.50] |
| 8U | 24 [165] | 14.07 [1.41] |
| 8V | 24 [165] | 11.93 [1.19] |
| 8W | 24 [165] | 14.52 [1.45] |
| 8X | 24 [165] | 9.70 [0.97] |
| 8Y | 25 [172] | 22.27 [2.23] |

As is apparent from the data, an increase in the K$_{UF}$ results in a logarithmic increase in the pressure drop as a function of thickness of the filtration membrane. This relationship is characteristic of an isotropic filtration membrane, and confirms that the membrane is isotropic in nature.

All of the references cited herein, including patents, patent applications, and publications, are hereby incorporated in their entireties by reference.

While the invention has been described in some detail by way of illustration and example, it should be understood that the invention is susceptible to various modifications and alternative forms, and is not restricted to the specific embodiments set forth. It should be understood that these specific embodiments are not intended to limit the invention but, on the contrary, the intention is to cover all modifications, equivalents, and alternatives falling within the spirit and scope of the invention.

We claim:

1. A device for processing a biological fluid comprising at least one melt-blown fibrous web, said device having a region for receiving a biological fluid containing an analyte and other substances, and a region into which said analyte flows without at least a portion of said other substances, wherein said web comprises fibers such that 90% of said fibers have a diameter ranging from a minimum fiber diameter to a maximum fiber diameter which is no more than about three times the minimum fiber diameter, and wherein said web has a critical wetting surface tension (CWST) of at least about 65 dynes/cm.

2. The device of claim 1, wherein said fibers comprise at least one of polybutylene terephthalate, polyethylene terephthalate, and nylon.

3. The device of claim 1, having at least a first surface for contacting the biological fluid, and a second surface through which said analyte flows without at least a portion of said other substances.

4. The device of claim 3, wherein said device further comprises a porous medium having at least an upstream surface and a downstream surface, wherein at least a portion of said upstream surface of said porous medium is in fluid communication with said second surface of said web, and wherein said porous medium allows for said analyte to be captured thereby and prevents at least some of said other substances from passing therein.

5. The device of claim 4, wherein said porous medium has a cantilevered region which extends beyond said web.

6. The device of claim 4, wherein said porous medium comprises a porous membrane.

7. The device of claim 6, wherein said porous membrane comprises an isotropic, skinless, polyvinylidene fluoride membrane.

8. The device of claim 7, wherein said porous membrane has a titer reduction of at least about $10^8$ against T$_1$ bacteriophage.

9. The device of claim 8, wherein said porous membrane has a K$_{UF}$ of at least about 15 psi when tested using liquid pairs having an interfacial tension of about 4 dynes/cm.

10. The device of claim 6, wherein said porous membrane comprises a hydrophilic nylon membrane.

11. The device of claim 10, wherein said porous membrane has an absolute pore size of about 2 μm or less.

12. The device of claim 6, wherein said device further comprises at least one nonporous medium which is in contact with at least one surface of said porous medium.

13. The device of claim 5, wherein said web contains a compressed portion adjacent to said cantilevered region of said porous medium which prevents at least some of said other substances from passing therethrough to said cantilevered region.

14. The device of claim 3, wherein said device further comprises at least one nonporous medium which is in contact with said surface of said web.

15. The device of claim 4, wherein said device further comprises a second porous medium interposed between said web and the first porous medium.

16. The device of claim 15, wherein said second porous medium comprises a second melt-blown fibrous non-woven web.

17. The device of claim 4, wherein said device further comprises a second porous medium having an upstream surface and a downstream surface, and said upstream surface of said second porous medium is in fluid communication with said first porous medium.

18. The device of claim 17, wherein said first porous medium comprises a porous membrane.

19. The device of claim 18, wherein said porous membrane comprises an isotropic, skinless, polyvinylidene fluoride membrane.

20. The device of claim 19, wherein said porous membrane has a titer reduction of at least about $10^8$ against T$_1$ bacteriophage.

21. The device of claim 20, wherein said porous membrane has a K$_{UF}$ of at least about 15 psi when tested using liquid pairs having an interfacial tension of about 4 dynes/cm.

22. The device of claim 18, wherein said second porous medium comprises a melt-blown fibrous non-woven web.

23. The device of claim 22, wherein said device further comprises one or more nonporous media adhered to said device so as to reduce evaporation of said biological sample.

24. The device of claim 22, wherein the second porous medium has a higher CWST than the melt-blown fibrous web receiving the biological fluid sample.

25. The device of claim 1, wherein the web has an average fiber diameter of less than about 4 μm.

26. The device of claim 25, wherein the web has a voids volume in the range of about 70% to about 95%.

27. The device of claim 26, wherein the voids volume is in the range of about 75% to about 85%.

28. The device of claim 27, wherein the voids volume is in the range of about 78% to about 81%.

29. The device of claim 1, wherein said web has a CWST of at least about 70 dynes/cm.

30. The device of claim 29, wherein said web has a CWST of at least about 90 dynes/cm.

31. The device of claim 30, wherein said web has a CWST of at least about 110 dynes/cm.

32. The device of claim 1, wherein the web has a basis weight of at least about 2 g/ft$^2$.

33. The device of claim 32, wherein the web has a basis weight of at least about 4 g/ft$^2$.

34. The device of claim 33, wherein the web has a basis weight in the range of from about 5 to about 8 g/ft$^2$.

35. The device of claim 1, wherein said device further comprises one or more nonporous media adhered to said device so as to reduce evaporation of said biological sample.

36. The device of claim 25, wherein the web has an average fiber diameter of less than about 2 $\mu$m.

37. A device for processing a biological fluid comprising a melt-blown fibrous web, wherein said web comprises fibers such that 90% of said fibers have a diameter ranging from a minimum fiber diameter to a maximum fiber diameter which is no more than about three times the minimum fiber diameter, and wherein said web has a critical wetting surface tension (CWST) of at least about 76 dynes/cm, and wherein said web has a voids volume in the range from about 75% to about 85%.

38. The device of claim 37, wherein the web includes a basis weight in the range of from about 3 to about 7 g/ft$^2$.

39. The device of claim 37, wherein said web includes a voids volume in the range of about 78% to about 81%.

40. The device of claim 39, wherein said web has a CWST of at least about 95 dynes/cm.

41. The device of claim 40, wherein said web has a CWST of at least about 100 dynes/cm.

42. A device for processing a biological fluid comprising a melt-blown fibrous web, wherein said web comprises fibers such that 90% of said fibers have a diameter ranging from a minimum fiber diameter to a maximum fiber diameter which is no more than about three times the minimum fiber diameter, and wherein said web has a critical wetting surface tension (CWST) of at least about 98 dynes/cm, and wherein said fibers have an average fiber diameter of about 2 $\mu$m or less, wherein said web has a voids volume in the range from about 75% to about 85%.

43. The device of claim 42, wherein said web has a basis weight of at least about 3 g/ft$^2$.

44. The device of claim 43, wherein said web has a CWST of at least about 105 dynes/cm, and includes a voids volume in the range of from about 77% to about 84%.

45. The device of claim 44, wherein said web has a basis weight of at least about 5 g/ft$^2$.

46. The device of claim 45, wherein said fibers have an average fiber diameter of about 1.8 $\mu$m or less.

47. A device for processing a biological fluid comprising at least a first melt-blown fibrous wed and a second melt-blow fibrous web, said first web having a region for receiving a biological fluid containing an analyte and other substances, and said second melt-blown fibrous web having a region into which said analyte flows without at least a portion of said other substances, wherein said first and second webs each comprise fibers such that 90% of said fibers have a diameter ranging from a minimum fiber diameter to a maximum fiber diameter which is no more than about three times the minimum fiber diameter, and wherein said first and second webs each have critical wetting surface tension (CWST) of at least about 65 dynes/cm.

48. The device of claim 1, wherein the web includes a region into which said analyte flows without at least a portion of said other substances.

49. The device of claim 1, wherein said device further comprises a porous medium having at least an upstream surface and a downstream surface, wherein at least a portion of said upstream surface of said porous medium is in fluid communication with said web, and wherein said porous medium allows for said analyte to be captured thereby and prevents at least some of said other substances from passing therein.

50. The device of claim 49, wherein said porous medium comprises a microporous membrane.

51. A method of processing a biological fluid comprising contacting said biological fluid receiving region of said device of claim 1 with a biological fluid containing an analyte and other substances.

52. The method of claim 51, comprising contacting the region with about 20 $\mu$L of blood or less.

53. The method of claim 52, comprising contacting the region with about 10 $\mu$L of blood.

54. The method of claim 53, wherein said biological fluid is blood or a blood product, and said analyte is plasma.

55. The method of claim 51, wherein said biological fluid is blood or a blood product, and said analyte is a virus.

56. The method of claim 51, wherein said biological fluid is blood or a blood product, and said analyte is glucose.

57. The method of claim 51, wherein said biological fluid is plasma, and said analyte is a virus.

58. A method for processing a biological fluid comprising:
contacting a melt-blown fibrous web with the biological fluid, wherein said web comprises fibers such that 90% of said fibers have a diameter ranging from a minimum fiber diameter to a maximum fiber diameter which is no more than about three times the minimum fiber diameter, and wherein said web has a critical wetting surface tension (CWST) of at least about 65 dynes/cm.

59. The method of claim 58, wherein contacting the web with a biological fluid comprises contacting the web with blood, and separating plasma from the blood.

60. The method of claim 58, wherein contacting the web with a biological fluid comprises contacting the web with blood, and passing plasma through the web ahead of the red cells in the blood.

61. The method of claim 59, further comprising passing the plasma from the web into at least one porous medium.

62. The method of claim 61 wherein the porous medium comprises at least one of an additional melt-blown web, and a microporous membrane.

63. The method of claim 58, wherein the biological fluid includes at least one of glucose; cholesterol; at least one serum enzyme; at least one lipid; and at least one drug.

* * * * *